US006692647B2

(12) United States Patent
Moshrefzadeh et al.

(10) Patent No.: US 6,692,647 B2
(45) Date of Patent: Feb. 17, 2004

(54) LIGHT DISPERSING FILM AND METHOD OF MANUFACTURE

(75) Inventors: Robert S. Moshrefzadeh, St. Paul, MN (US); Ragunath Padiyath, St. Paul, MN (US); Richard J. Pokorny, St. Paul, MN (US); Hsin-hsin Chou, St. Paul, MN (US); Jeffrey C. Chang, St. Paul, MN (US); Colleen M. Brenner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 151 days.

(21) Appl. No.: 09/967,352

(22) Filed: Sep. 28, 2001

(65) Prior Publication Data

US 2002/0034618 A1 Mar. 21, 2002

Related U.S. Application Data

(60) Division of application No. 09/192,118, filed on Nov. 13, 1998, now Pat. No. 6,344,263, which is a continuation-in-part of application No. 09/050,489, filed on Mar. 30, 1998, now abandoned.

(51) Int. Cl.⁷ .............................. B29D 11/00; G02B 5/02
(52) U.S. Cl. ..................... 216/24; 359/452; 359/456; 359/457; 428/206
(58) Field of Search ................. 216/24; 428/206; 359/452, 456, 457

(56) References Cited

U.S. PATENT DOCUMENTS

| | | | |
|---|---|---|---|
| 3,552,822 A | | 1/1971 | Altman |
| 3,614,199 A | | 10/1971 | Altman |
| 3,758,193 A | * | 9/1973 | Tung .................. 359/359 |
| 4,328,274 A | * | 5/1982 | Tarbutton et al. ........ 428/149 |
| 4,490,010 A | | 12/1984 | Honda |
| 4,715,137 A | | 12/1987 | Scheve |
| 5,543,870 A | * | 8/1996 | Blanchard ............... 353/74 |
| 5,563,738 A | | 10/1996 | Vance |
| 5,620,775 A | * | 4/1997 | LaPerre ................ 428/149 |
| 5,706,134 A | * | 1/1998 | Konno et al. ............ 359/599 |
| 5,731,874 A | * | 3/1998 | Maluf .................. 356/326 |
| 5,781,344 A | * | 7/1998 | Vance .................. 359/614 |
| 2002/0126377 A1 | * | 9/2002 | Nakagawa et al. ........ 359/443 |

FOREIGN PATENT DOCUMENTS

| | | |
|---|---|---|
| JP | 02-073242 | 3/1990 |
| JP | 03-053232 | 3/1991 |
| JP | 5273651 | 10/1993 |
| JP | 09-096870 | 4/1997 |
| JP | 09-152659 | 6/1997 |
| JP | 09-258331 | 10/1997 |
| WO | 95/06888 | 3/1995 |

OTHER PUBLICATIONS

Jenkins, Francis A. and White, Harvey E., "Fundamentals of Optics", International Student Edition, Jun., 1976, p. 567.
Smith, Warren J., "The Design of Optical Systems", Modern Optical Engineering, Second Edition, pp. 257 and 258, Aug., 1990.
Stupp, Edward H. and Brennesholtz, Matthew S., "Projection Displays", pp. 157–160, Nov., 1998.

* cited by examiner

Primary Examiner—Nadine G. Norton
Assistant Examiner—Shamim Ahmed
(74) Attorney, Agent, or Firm—William D. Miller

(57) ABSTRACT

A beaded light dispersing film has a substrate layer, and an optically transparent layer, having a predetermined thickness, disposed over a side of the substrate layer. Optically transmitting beads are arranged to penetrate at least partially into the transparent layer to define clear apertures at interfaces between the beads and the transparent layer. The bead radius is greater than the predetermined thickness. An absorbing layer is disposed on the transparent layer, in interstices between the beads. A method of manufacturing the film includes disposing optically transparent beads partially in an optically transparent layer disposed over a transparent substrate layer. The optically transparent layer has a thickness less than half a diameter of a transparent bead. An absorbing layer overlies the optically transparent layer.

21 Claims, 16 Drawing Sheets

LIGHT DISPERSING FILM AND METHOD OF MANUFACTURE

This is a divisional of application Ser. No. 09/192118 filed Nov. 13, 1998, now U.S. Pat. No. 6,344,263 which is a continuation-in-part of U.S. application Ser. No. 09/050, 489, filed Mar. 30, 1998, now abandoned.

BACKGROUND

The present invention is directed generally to a light dispersing film and a method of manufacture, and particularly to a beaded light dispersing film.

Beaded light dispersing films are used with rear projection screens and monitors for transmitting an image from one side of a screen to a viewer on the other side. Such films typically include a number of small beads attached to a substrate film, and an opaque layer disposed between the beads so that whatever light is not transmitted through a bead is absorbed by the opaque layer. The opaque layer also absorbs ambient light incident on the film from the viewer's side, thus reducing the background light detected by the viewer.

Dispersing films are characterized by the gain, resolution, transmission, ambient light rejection and contrast, which properties are determined by the structure and materials employed in its construction. The gain is a measure of the intensity of the light transmitted by the film as a function of angle measured from normal incidence, and is determined, at least in part, by the refractive index of the beads and the surrounding material. The viewing angle of a particular film is defined as that angle at which the intensity is half the intensity of the light transmitted on-axis. The resolution of the film is determined, at least in part, by the size of the beads. Ambient light rejection and contrast are affected by absorption of the opaque layer.

The interdependence of the optical properties of the various components of the film limit the optimization of the film characteristics. There is, therefore, a need to overcome this interdependence so that new films may be produced having superior characteristics of gain, resolution, efficiency, ambient light rejection and contrast.

SUMMARY OF THE INVENTION

Generally, the present invention relates to a light dispersing film and its method of manufacture. In one embodiment the film has an optically transparent layer and optically transmitting beads arranged to penetrate at least partially into a first surface of the transparent layer to define clear apertures at interfaces between the beads and the transparent layer. An absorbing layer is disposed on the transparent layer, in interstices between the beads. The beads penetrate into the transparent layer to a depth selected to substantially achieve maximum transmission of light through the optically transmitting beads, while maintaining essentially optimum contrast for the maximum light transmission.

In another embodiment, the film includes a layer of optically transparent material having a support surface and a plurality of beads of optically transmitting material having a selected shape and refractive index and arranged in a single-layer array on the support surface, each bead at least partially disposed within the layer of optically transparent material to produce an interface therewith, the interface defining a clear exit aperture. A layer of light absorbing material having a selected thickness is affixed to the layer of optically transparent material, for controlling ambient light rejection of the light filter and to reduce light transmission through interstices formed by the plurality of beads. The beads penetrate into the layer of optically transparent material to a depth selected to substantially maximize transmission of light through the plurality of beads.

In another embodiment, the film includes optically transmitting beads arranged to penetrate at least partially into a first surface of a transparent layer. The beads define clear apertures at interfaces between the beads and the transparent layer. An absorbing layer is disposed on the transparent layer, in interstices between the beads, and a transparent cover layer is disposed over the absorbing layer and the optically transmitting beads.

A method of manufacturing the film includes disposing optically transparent beads partially into an optically transparent layer, a bead penetration depth into the optically transparent layer being selected to substantially maximize light transmission through the optically transparent beads, an absorbing layer overlying the optically transparent layer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
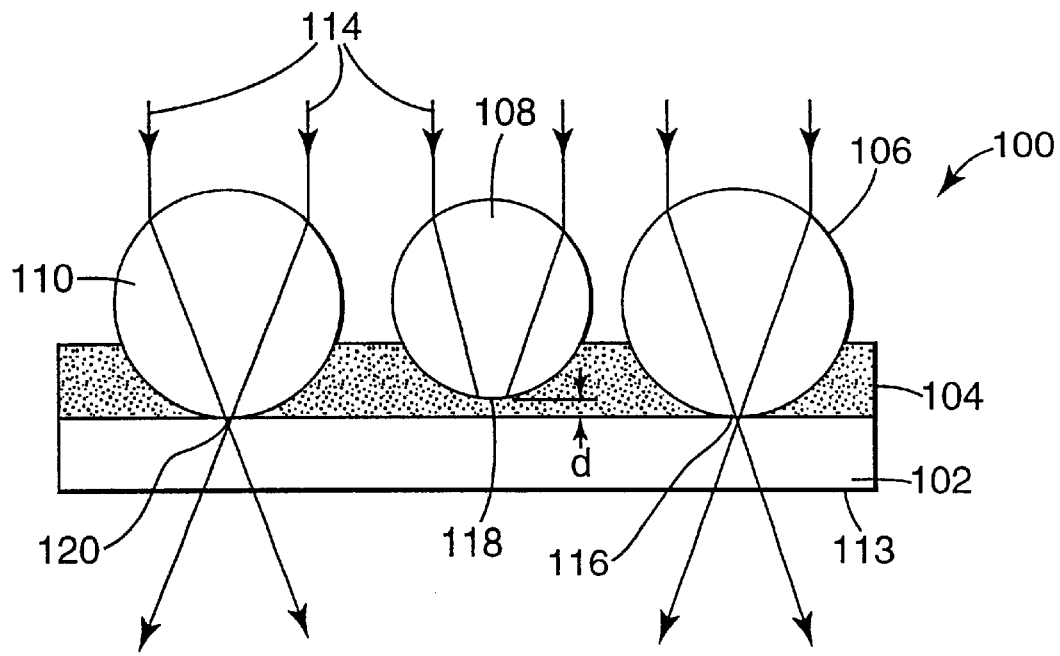
FIGS. 1A and 1B illustrate a dispersing film having refracting beads with exit apertures disposed within an absorbing layer.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to light dispersing films, and is believed to be particularly suited to light dispersing films for use with rear projection screens and monitors. One of the advantages of the invention is that the interdependence of the optical properties of the various components of the film is reduced, thus permitting a selected film characteristic to be optimized without adversely affecting the other characteristics. This may be better understood with reference to FIG. 1A which illustrates, for comparison, a film 100, having a substrate layer 102 covered by an opaque layer 104. In this film the refracting beads 106, 108 and 110 are supported in the opaque layer 104. Image light 114 is incident on the back side of the film 100 from a source. Some of the image light 114 is refracted on passing into the beads 106, 108 and 110, and is directed to respective exit portions 116, 118, and 120, where the opaque layer 104 is thinnest. Generally light escapes through the exit portions 116, 118 and 120, into the substrate 102 and out to the viewing side of the film 113.

The opaque layer 104 performs a number of functions, including supporting the beads, defining the exit aperture of the beads, controlling light passing through the interstices between beads and controlling ambient light. Ideally, the opacity of the opaque layer is high in order to control interstitial light and ambient light. However, the opacity of the opaque layer should be low for controlling the aperture of the bead. The reason for this is that the majority of the light passing through the exit portion of a bead passes through a portion of the opaque layer 104. In order to permit a reasonable amount of light through the exit portion, and thus increase the transmission of the film, the opaque layer should have a low opacity. Therefore, a compromise is required in the optical properties of the opaque layer, and it is difficult, if not impossible, to optimize ambient and interstitial light control at the same time as optimizing the transmission of the film.

Another reason for low transmission through the film 100 arises because beads available for manufacturing the film 100 typically vary in size. For example, beads used in fabricating the film 100 may have an average diameter of 60 $\mu$m, with a standard deviation of 12 $\mu$m. Consequently, when the beads are pressed into the opaque layer 104 during the manufacturing process, the larger beads, such as beads 106 and 110, are pressed down close to the substrate layer 102, while the smaller beads, for example 108, are not pressed as far. This results in a substantial thickness, d, of opaque layer 104 underlying the smaller bead 108, which absorbs the light exiting from the smaller bead 108.

Figure 1B:
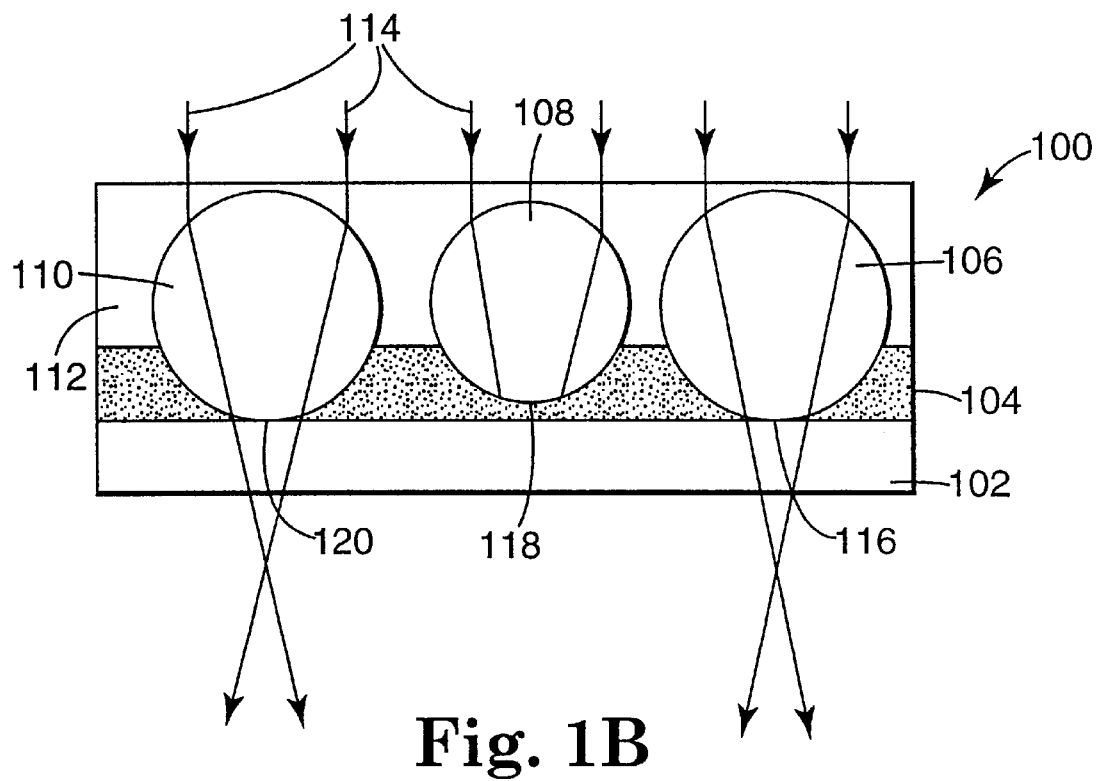

An overlayer 112 covering the beads 106, 108 and 110 and the opaque layer 104, as illustrated in FIG. 1B, may be used to protect the beads, support the beads in the film, or provide a flat surface for receiving other films.

Figure 2A:
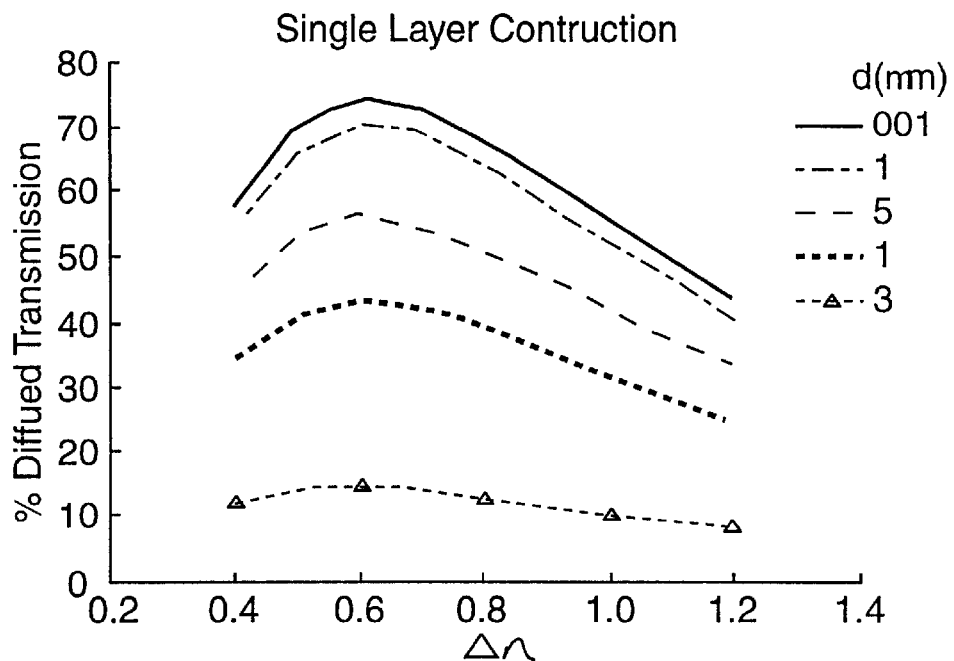
FIGS. 2A and 2B respectively illustrate plots of light transmission vs. bead refractive index for the films of FIGS. 1A and 1B.

The problems associated with the opaque layer 104 have a serious effect on the transmission of the film 100. This is illustrated in FIG. 2A, which shows the calculated variation of diffused light transmission through the film 100 as a function of $\Delta n$ for different values of d, where $\Delta n$ is the change in refractive index experienced by the light on entering the beads. When there is no overlayer 112, $\Delta n = n_1 - 1$, where $n_1$ is the refractive index of the bead. Where the overlayer has a refractive index of $n_0$, $\Delta n = n_1 - n_0$. The values of d illustrated on the graph are given in microns. The absorption coefficient of the opaque layer was assumed to be 0.5 $\mu m^{-1}$. The plot illustrates a maximum efficiency of approximately 75% for a glass bead refractive index of 1.5 for the impractical case where the thickness, d, is negligible. More realistically, the thickness, d, is of the order of 1 $\mu$m or more, especially where there is a large variation in bead size. The transmission is significantly less when realistic values of d are considered, having a maximum of only about 42% when d=1 $\mu$m. The transmission drops further to about 16% for d=3 $\mu$m.

The refractive effect of the beads 106, 108 and 110 depends on the change in refractive index experienced by light on passing into the beads 106, 108 and 110. Since the refractive index of the cover layer 112 is typically higher than that of air, the focusing power of the beads 106, 108 and 110 is reduced in the presence of the cover layer 112. Consequently, the light exiting the beads 106, 108 and 110 is less concentrated at the output portions 116, 118 and 120, with the result that a greater fraction of light passes through a significant thickness of the opaque layer 104 and is absorbed. Therefore, the introduction of the cover layer 112 can affect the total amount of light transmitted by the film 100.

Figure 3:
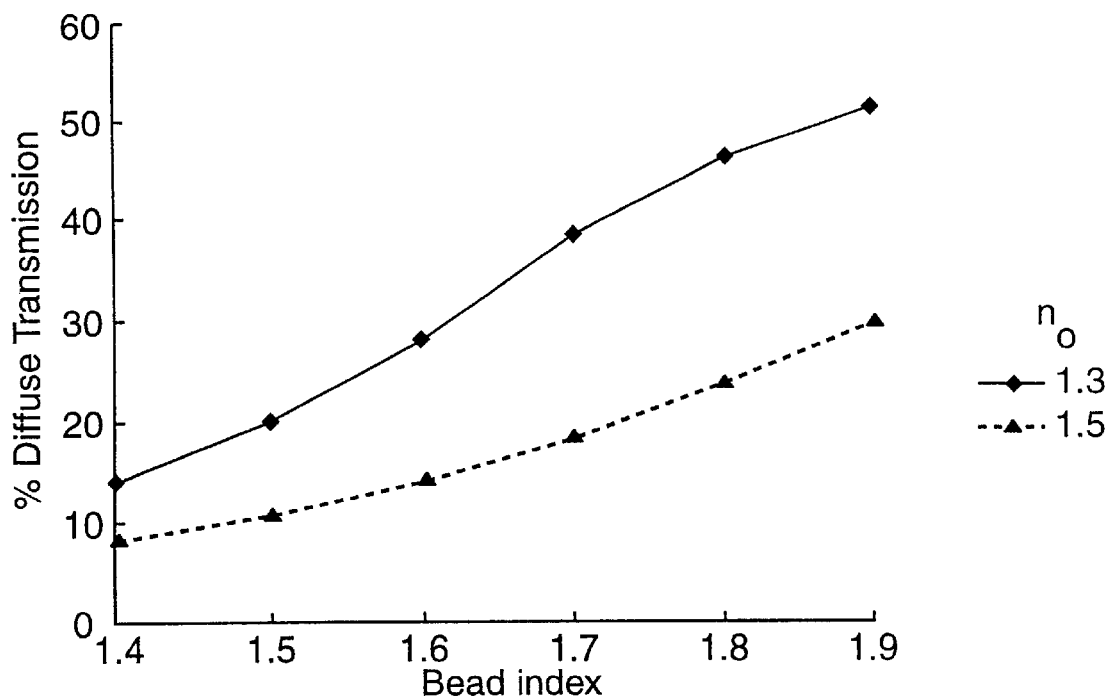
FIG. 3 illustrates a plot of light transmission vs. bead refractive index for the film of FIG. 1B for various values of cover layer refractive index.

This effect on the transmission is illustrated in FIG. 3, which shows plots of the light transmission through a beaded film calculated as a function of bead refractive index for two values of refractive index, $n_0$, of the overlayer 112. In the calculations to produce the illustrated results, it was assumed that d=0 $\mu$m and that the beads were packed at maximum packing density. These plots illustrate that as the bead index increases, i.e. as $\Delta n$ increases, the focusing effect of the bead increases, thus constricting more light to the central, low loss portion of the bead output, and so overall transmission increases. Also, for a given bead index, the transmission is higher for a lower cover layer refractive index. However, few materials having a refractive index as low as 1.3 are available for use in the cover layer, while several materials are available that have a refractive index close to 1.5. Therefore, practical films of the sort illustrated in FIG. 1B suffer from low transmission.

There is, therefore, a substantial deficiency in the transmission of beaded dispersion screens of the sort just described. This transmission deficiency may be reduced by using mono-dispersed beads, i.e. beads of uniform size. However, it is more expensive to produce beads having little or no size variation, so the costs of the film are increased. In addition, practice shows that it is very difficult to reduce the value of d to the sub-micron level where the affect on the transmission is negligible, even when using mono-dispersed beads. Moreover, the use of mono-dispersed beads does not solve the problems of reduced transmission associated with the cover layer.

A related problem arises from the fact that the opaque layer 104 performs multiple functions. The opaque layer 104 absorbs interstitial light passing between the beads, absorbs ambient light incident on the film 100 from the viewing side and also controls the diameter of the exit portion of each bead. Most of the light exiting from the beads passes through a portion of the opaque layer 104 because the opaque layer underlies substantially all of each bead. In order to increase the transmission through the film 100, the light that exits the beads should not be strongly absorbed, and so the absorption length of the opaque layer should be long. On the other hand, in order to control ambient light and interstitial light, the absorption length of the opaque layer should be short. These requirements on the absorption depth are in conflict. Thus, because the opaque layer 104 performs multiple functions, its optical properties may not permit optimal film performance.

In view of these problems with this film, another approach is needed.

The film of the present invention reduces the problems of low transmission without requiring the use of mono-dispersed beads. Instead, the exit face of the bead is not contained within the absorbing layer, but is positioned within an optically transmitting material. In one particular approach, an optically clear layer is disposed between the opaque layer and the substrate layer. The beads penetrate into the clear layer, and so the opaque material between the exit portions of the beads and the substrate is either minimized or avoided. In addition, it is the clear layer which controls the size of the exit aperture of the beads, and not the opaque layer. In another particular approach, the beads penetrate through the absorbing layer into a clear substrate layer, and so the opaque material between the bead and the substrate is avoided. In addition, it is the penetration depth of the beads into the transparent substrate layer that controls the size of the exit aperture of the beads, and not the opaque layer.

Thus, functions which impose conflicting requirements on the opaque layer in the film described in FIG. 1A are decoupled, and it is possible to increase the performance of the film beyond that possible with a old film.

Figure 1C:
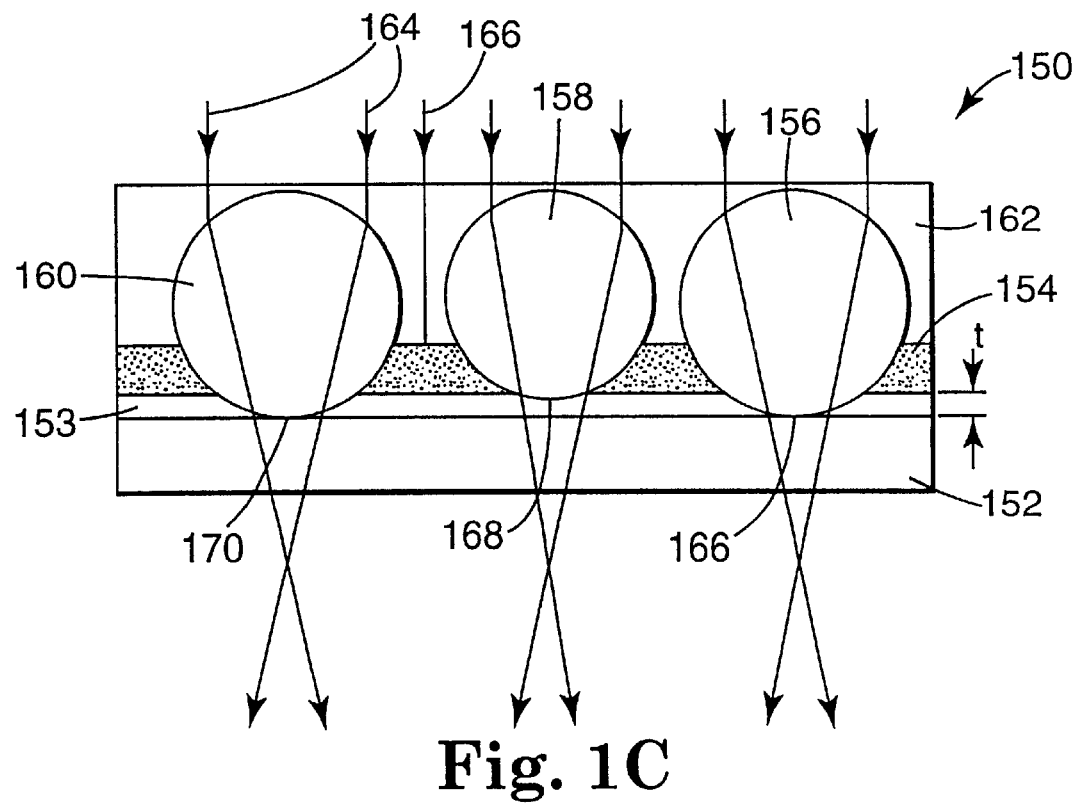
FIGS. 1C–1E illustrate embodiments of a film according to the present invention.

One particular embodiment of the invention is illustrated in FIG. 1C. The film 150 has a transparent substrate layer 152, on top of which is disposed a layer of optically transparent material 153, having a thickness, t. Typically, t is less than the radius of the bead, and may have a thickness of the order of one micron or so. The substrate layer 152 may be formed from any suitable transparent material, including acrylic. Where the film 150 is to be flexible, the substrate layer 152 may be formed from a polyester or, if an optically isotropic material is required, from polycarbonate. The transparent material 153 may be formed by coating an optically clear polymer layer on the substrate layer 152. The polymer may be a compliant material, such as a thermoplastic or a pressure sensitive adhesive, or may be a curable clear layer, for example a polymer that is thermally curable or curable by exposure to radiation.

An absorbing layer 154 overlies the layer of transparent material 153. The absorbing layer 154 typically has an optical density greater than 4 so that the film contrast is kept high by extinguishing interstitial light 165 passing between the beads 168 and 170. The absorbing layer 154 may be formed from a polymer having a light absorbing agent such as a dye, pigment, or carbon black disposed therein. The absorbing layer 154 may also be a powder coating of carbon black, black dyes, opaque particles or inorganic particles, or such particles dispersed within a binding material. In one particular embodiment, the absorbing layer 154 is formed from a clear binder having black particles disposed therethrough. The binder may be, for example an acrylate or other UV-curable polymer.

The absorbing layer may be made with a very high optical density. Also, unlike the single layer film 100, the absorbing layer 154 of the film 150 need not be used to support the beads. Consequently, the absorbing layer 154 may be made very thin relative to the bead diameter.

Beads 156, 158 and 160 are positioned to penetrate through the absorbing layer 154 and into the transparent material 153 so that their exit portions 166, 168 and 170 lie within the transparent material 153. The beads may be glass beads, but may also be made from other optically transparent material including polymeric materials, such as polymethylmethacrylate.

The layer of transparent material 153 may be made to be substantially less than the radius of the beads, even less than about 10% of the bead radius, so that there is sufficient absorbing material around the lower portion of the bead to maintain high film contrast.

Figure 1D:
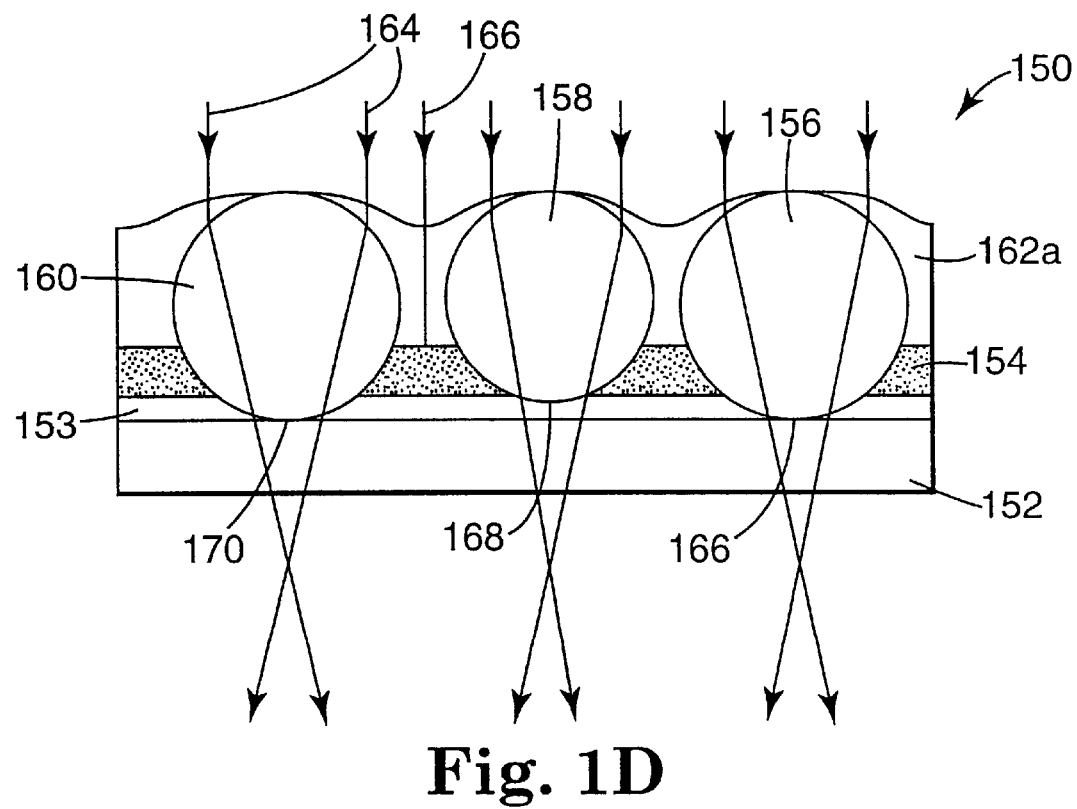

The film 150 may be used either with or without a cover layer 162 covering the beads 156, 158 and 160, and the absorbing layer 154. The cover layer 162 may be formed from any suitable transparent material, such as a polymer, sol-gel coating and the like. Advantages provided by the cover layer 162 include protecting the beads, supporting the beads in the film, and an improved diffuse light transmission. The cover layer 162 may provide a flat outer surface upon which additional layers can be disposed. The cover layer 162a may conform to the surface topology of the beads, as shown in FIG. 1D, with the effect that the radius of curvature of the beads is reduced.

The exit portions 166, 168 and 170 of the beads 156, 158 and 160 are located within the transparent material 153. An advantage provided by this embodiment is that, even though bead 158 is smaller than the adjacent beads 156 and 160, light exiting from the exit portion 168 propagates into the transparent material 153, and through the substrate layer 152 to the viewing side of the film. Thus, the placement of absorbing material at the output of the bead is avoided. The transmission aperture in the film 150 is effectively controlled by the thickness of the transparent material 153. Hence, the transmission of the film 150 is higher than the transmission of the single layer film 100.

Figure 1E:
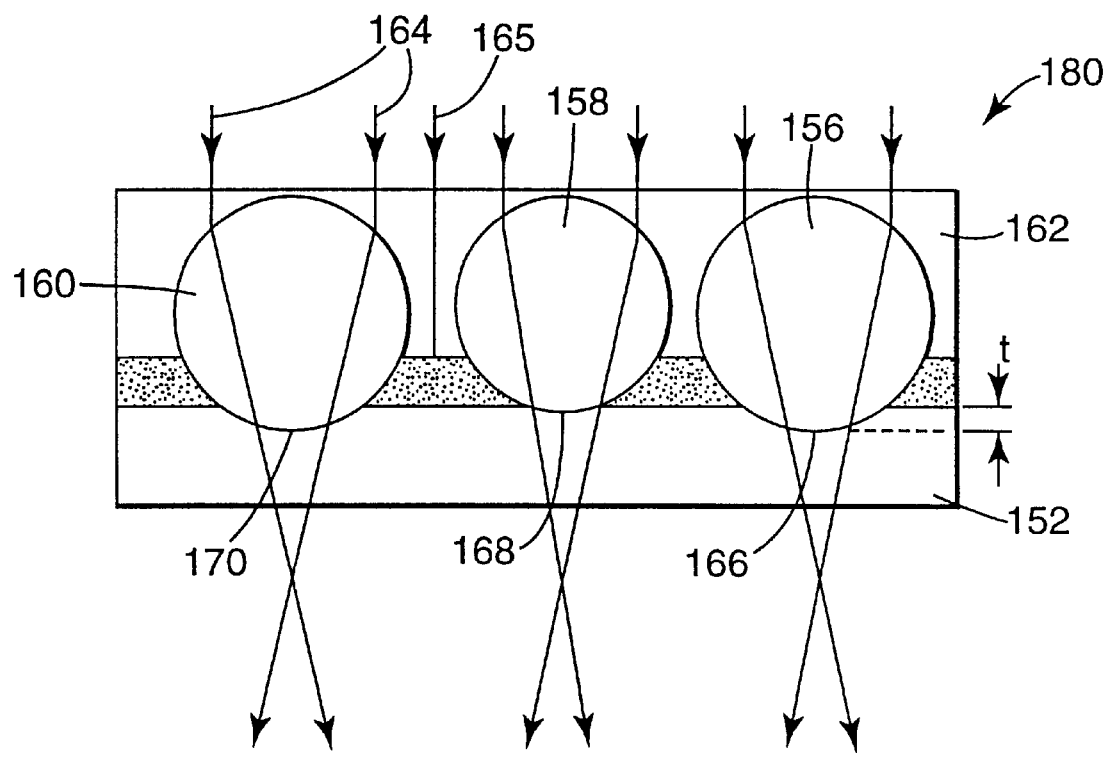

Another embodiment of the film 180 is illustrated in FIG. 1E, where the beads 156, 158 and 160 penetrate into the transparent layer 152, which may also act as a support for the film 180. The beads 156, 158 and 160 penetrate into the transparent layer 152 to a penetration depth of about t. This embodiment is different from that shown in FIG. 1C in that there is no separate layer of transparent material 153. In this film 180, the function of the transparent material 153 is also provided by the transparent layer 152. This embodiment has a simpler construction than that of FIG. 1C because there are fewer layers. The transmission aperture of this film 180 is effectively controlled by the penetration depth of the beads into the transparent layer 152. Hence, the transmission of the film 180 is higher than the transmission of the single layer film 100.

Most of the additional embodiments presented below are described in terms of having a substrate layer and a thin transparent layer into which the beads penetrate. It will be appreciated that this is not intended to limit the invention in any way, and the invention is also intended to cover embodiments where the beads penetrate through the absorbing layer into a single transparent layer, for example as illustrated in FIG. 1E.

Figure 2B:
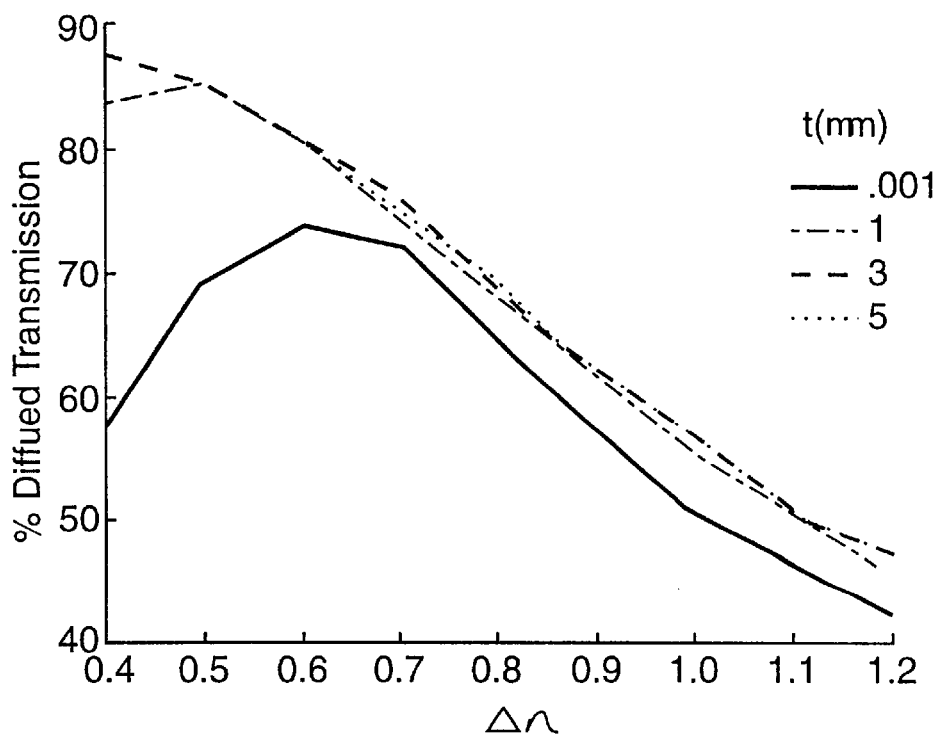

FIG. 2B illustrates the calculated light transmission through the film 150 as a function of refractive index change on entering the bead, Δn. It is assumed that the absorbing layer 154 has a thickness of 20 μm and an optical density of 0.5 μm$^{-1}$. A number of curves are shown, corresponding to different thicknesses of transparent material (or penetration depth), t. The addition of the layer of transparent material 153 (or the penetration of the beads into the transparent layer) reduces the absorption of light transmitted by the beads, resulting in transmission values significantly higher than are obtained with the single layer film 100, as shown in FIG. 2A.

Figure 4:
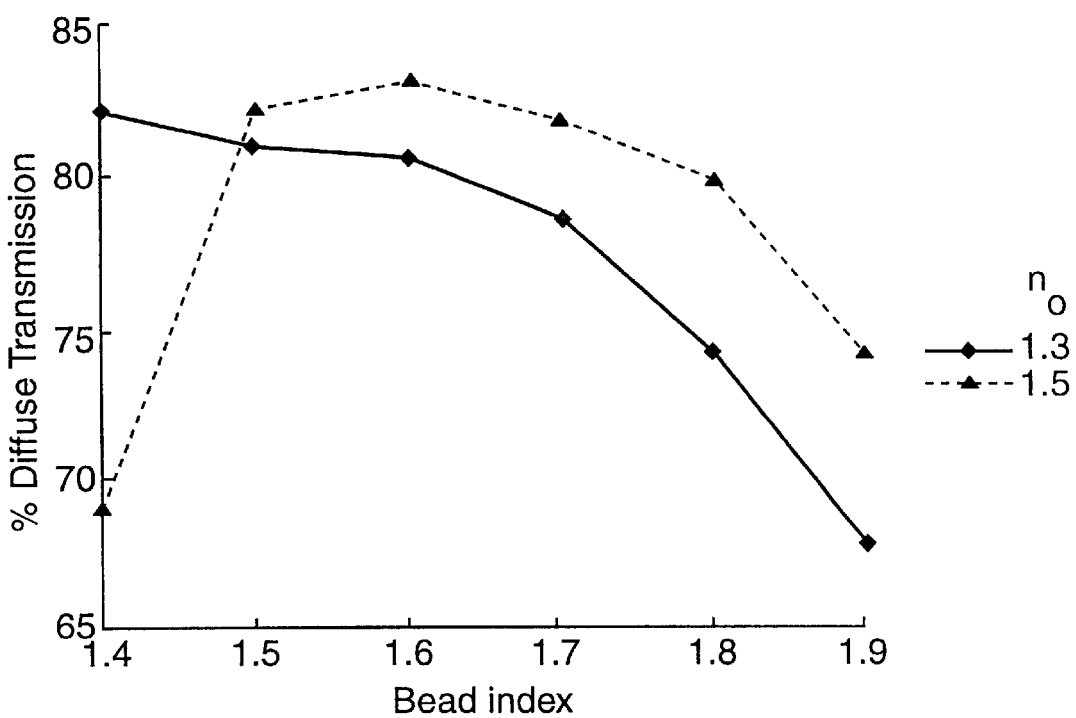
FIG. 4 illustrates a plot of light transmission vs. bead refractive index for the film of FIG. 1C for various values of cover layer refractive index.

A further advantage of the films 150 and 180 is that, unlike the film 100, the addition of a cover layer 162 does not introduce a severe reduction in overall light transmission and, in fact, may even improve the transmission. FIG. 4 illustrates the fraction of light transmitted by the film 150 or film 180 as a function of bead index, and for two values of cover layer refractive index. With the exception of the transparent layer, the assumptions made in the calculations to produce these results were the same as used in FIG. 3. There are several important differences between the results illustrated in FIGS. 3 and 4. First, it is important to note that the transmission of the film 150 or film 180 is substantially higher than the single layer film 100 over the entire range of bead refractive index illustrated. Second, for a given cover layer refractive index, the variation in transmission over the range of bead refractive index is less than for the single layer film 100. These improvements in the transmission properties arise, at least in part, because exit aperture of the beads is controlled by penetration of the beads into the transparent layer 153 or substrate layer 152, and not by the absorbing layer 154. Thus, the amount of light transmitted by the beads is not significantly dependent on the refracting power of the beads and so the introduction of the cover layer 162 has a smaller effect on transmission. Therefore, the refractive indices of the beads and the cover layer can be independently selected to control the gain and viewing angle of the film 150 and 180, with little effect on the film's transmission.

A value of minimum thickness, of the transparent layer 153, $t_{min}$, that corresponds to a film 150 having high light transmission is given by:

$$t_{min} = r\left(1 - \frac{x^2+8}{3x^2}\left[\frac{x^2-1}{3}\right]\right)$$

where r is the radius of the bead and x is given by the ratio $x=n_1/n_0$, where $n_1$ is the refractive index of the bead and $n_0$ is the refractive index of the cover layer 162. The transmission of light through the film is reduced when the thickness of the transparent layer, t, is less than $t_{min}$. For films having a thickness greater than $t_{min}$, i.e. where $t>t_{min}$, the transmission is high. However, the film contrast reduces for high values of t. Therefore, for applications where high film transmission and high contrast are important, the thickness of the transparent layer is set at approximately equal to $t_{min}$.

It will be appreciated that, where the beads penetrate through the absorbing layer into a single transmitting layer, for example as illustrated in FIG. 1E, the above discussion is also applicable where t is taken to be the penetration depth of the beads into the substrate layer. In such a case, $t_{min}$ is the penetration depth less than which the transmission of light through the film is non-optimal.

Figure 15:
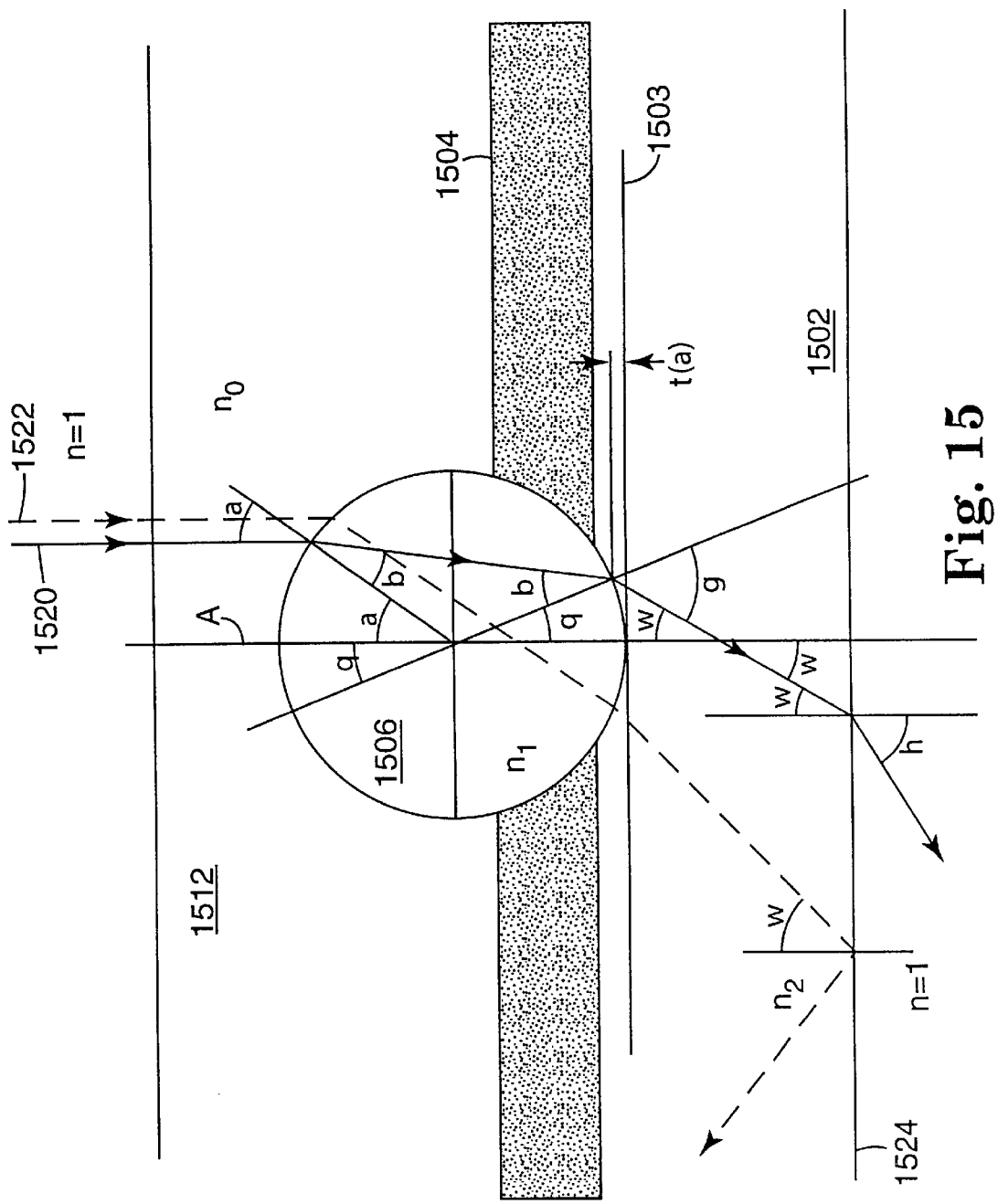
FIG. 15 illustrates the refraction of light passing through a bead in a two layer film having a clear top coating.

The expression for $t_{min}$ given above holds for values of x less than or equal to 2, for reasons which may be understood with reference to FIG. 15. The film includes a substrate layer 1502, a transparent layer 1503, a light absorbing layer 1504 and a transparent cover layer 1512. An incoming light ray 1520 (solid line) is illustrated for the case where x is less than or equal to 2. The light ray 1520 enters the cover layer 1512, having a refractive index of $n_0$, in a direction substantially normal to the film. The ray 1520 is refracted on entering the bead 1506, which has a refractive index $n_1$. The ray 1520 is again refracted on exiting the bead 1506 into the transparent layer 1503 and then substrate 1502; it is assumed that the transparent layer 1503 and the substrate 1502 each have a refractive index given by $n_2$. On exiting the film, the ray 1520 emerges at an angle η, as shown.

For x less than or equal to 2, the height between the substrate 1502 and the point at which ray 1520 exits the bead 1506 defines the thickness, t(α), of the transparent layer 1503 through which the particular ray 1520 travels. The angle of incidence, α, on the outer surface of the bead 1506 is greater for rays increasingly removed from the center-line, A, of the bead 1506. The thickness, t(α), increases with increasing incident angle, α, until it reaches a maximum, and then reduces as α approaches 90°. The expression given above for $t_{min}$ is an analytical expression that describes this maximum thickness.

On exiting the film, the ray 1520 emerges at an angle η. If, at some incident angle, $α_{tir}$, η becomes larger than 90°, then the light is totally internally reflected at the lower surface of the substrate 1502. In other words, the angle ω becomes greater than the critical angle. This case is illustrated for ray 1522. The corresponding thickness at $α_{tir}$ is defined as $t_{tir}$. The value of thickness $t_{tir}$ may be derived using numerical techniques. The minimum thickness for the transparent layer 1503 which produces the highest transmission of light is the larger of $t_{min}$ and $t_{tir}$. The solution for $t_{min}$ does not exist for x less than or equal to 2. Therefore, for x less than or equal to 2, the minimum coating thickness for maximum light transmission through the beads is given by $t_{tir}$.

Figure 19:
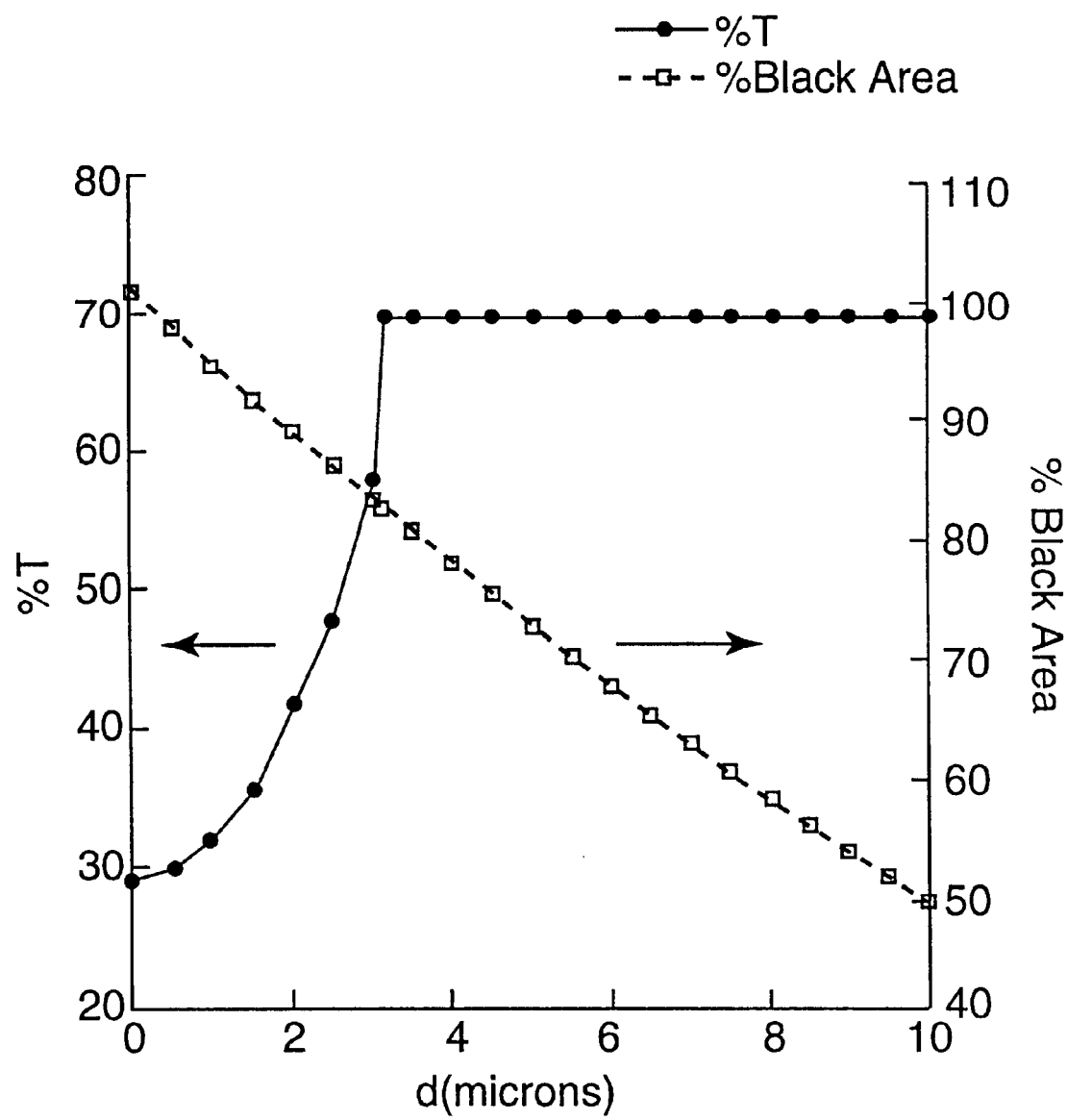
FIG. 19 illustrates film contrast and transmission plotted as functions of bead penetration depth.

The effects of penetration depth on transmission through the film and film contrast are illustrated in FIG. 19. The transmission of the film (black dots) increases with increasing thickness, t, of the transparent layer or, equivalently, with increasing penetration depth. The model used to generate the results illustrated in FIG. 19 used the following assumptions: the packing of the beads in the film is at maximum density (hexagonal close-packed) in a monolayer, all beads have a diameter of 60 μm and penetrate to the same depth, t. In addition, the thickness, t, and the thickness of the absorbing layer sum to 30 μm and the absorption coefficient of the absorbing layer is 0.5 μm$^{-1}$. The substrate and transparent layers are assumed to have refractive indices of 1.58, while the bead refractive index is 1.9 and the clear cover layer has a refractive index of 1.5.

The transmission for a value of t=0 is approximately 29%, rising to approximately 70% for t=3.13 μm. The transmission remains at approximately 70% for values of t higher than 3.13 µm. The "% Black Area" is the percentage of the screen area, as seen by the viewer, that is black. The contrast afforded by the film is proportional to the percentage of black area and, therefore, a smaller fraction of black area represents a reduction in film contrast. The film contrast falls for transparent layer thickness increasing from zero to 10 µm.

Therefore, in order to obtain optimized film performance, the thickness of the transparent layer, or, equivalently, the depth of penetration, is preferably selected to maximize transmission through the film while maintaining as high a contrast as possible. Therefore, a preferred penetration depth for the film whose properties form the basis for the curves illustrated in FIG. 19, is approximately 3.1 µm, or a little above. A penetration depth significantly higher than about 3.1 µm results in a reduced contrast without any offsetting benefit in transmission.

Figure 5:
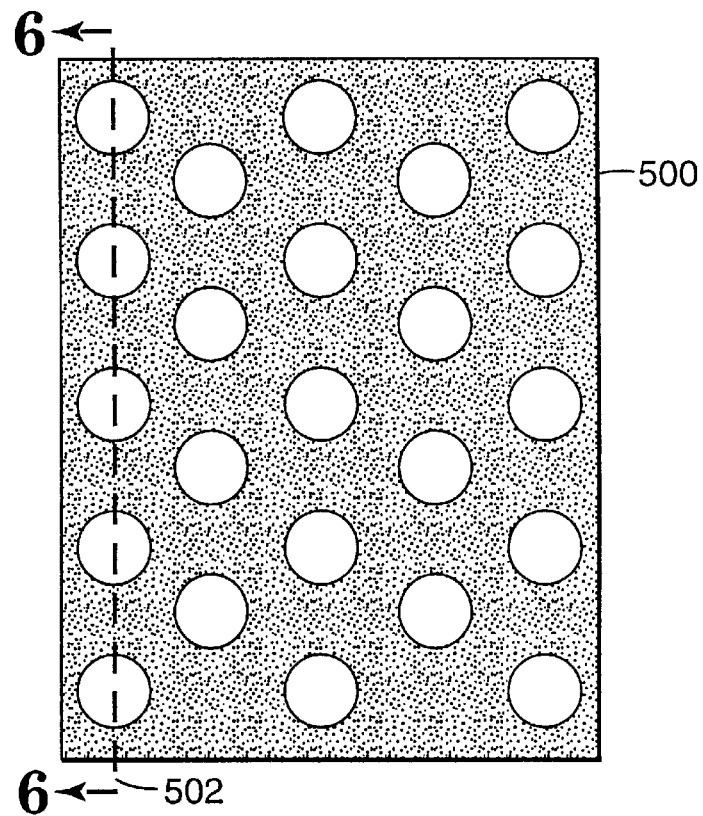
FIG. 5 illustrates a second embodiment of a film according to the present invention having a polarizing layer on a viewing side of the film.

The beads may be disposed in the film 150 in a number of different array patterns. One such array pattern is a hexagonally packed pattern, which advantageously permits a high packing density, thus increasing the resolution and transmission of the film. A top view of a film 500 having beads arranged in a hexagonally packed pattern is illustrated in FIG. 5. The dotted line 502 shows a cross-section 6—6 through the film 500. A portion of the section 6—6 is illustrated in FIG. 6 below.

Figure 6:
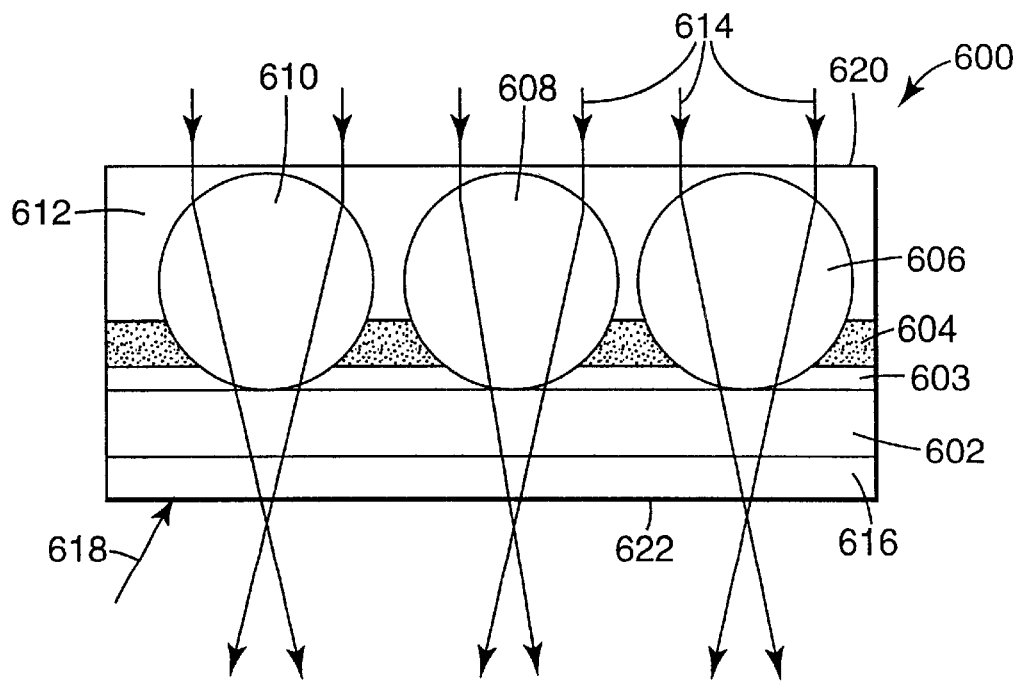
FIG. 6 illustrates a third embodiment of a film according to the present invention having polarizing and quarter-wave retardation layers.

FIG. 6 illustrates another embodiment of a film. This embodiment 600 is similar to that illustrated in FIG. 1B, having a substrate layer 602, a layer of transparent material 603, an absorbing layer 604, beads, 606, 608 and 610, and a transparent cover layer 612. Light 614 enters the illuminated surface 620 of the film 600, and exits through the viewing surface 622. In addition, a polarizing layer 616 is positioned on the viewing side of the film 600. The polarizing layer 616 may be formed from absorbing polarizer film, which preferentially absorbs light having a certain polarization, and which transmits light having the orthogonal polarization. The polarizing layer 616 may alternatively be positioned between the layer of transparent material 603 and the substrate layer 602.

An advantage provided by the polarizing layer 616 is that ambient light 618 incident on the viewing surface 622 of the film 600 is generally unpolarized and is therefore reduced in intensity by around 50% before passing into the film 600. This reduces the amount of ambient light reflected out of the film, resulting in greater contrast in the image transmitted through the film 600.

It will be appreciated that efficient use of the image light 614 requires the polarizing layer 616 to be oriented to permit high transmission of the image light 614. For example, the image light produced by an LCD projector is linearly polarized, and should be aligned for preferential transmission through the polarizer 616. It will also be appreciated that, where it is important to preserve the polarization of image light passing through the film 600, the film 600 is constructed from materials that do not alter the polarization of light passing therethrough. For example, the materials used for the substrate layer 602, the layer of transparent material and the cover layer 612 may be optically isotropic.

Figure 7:
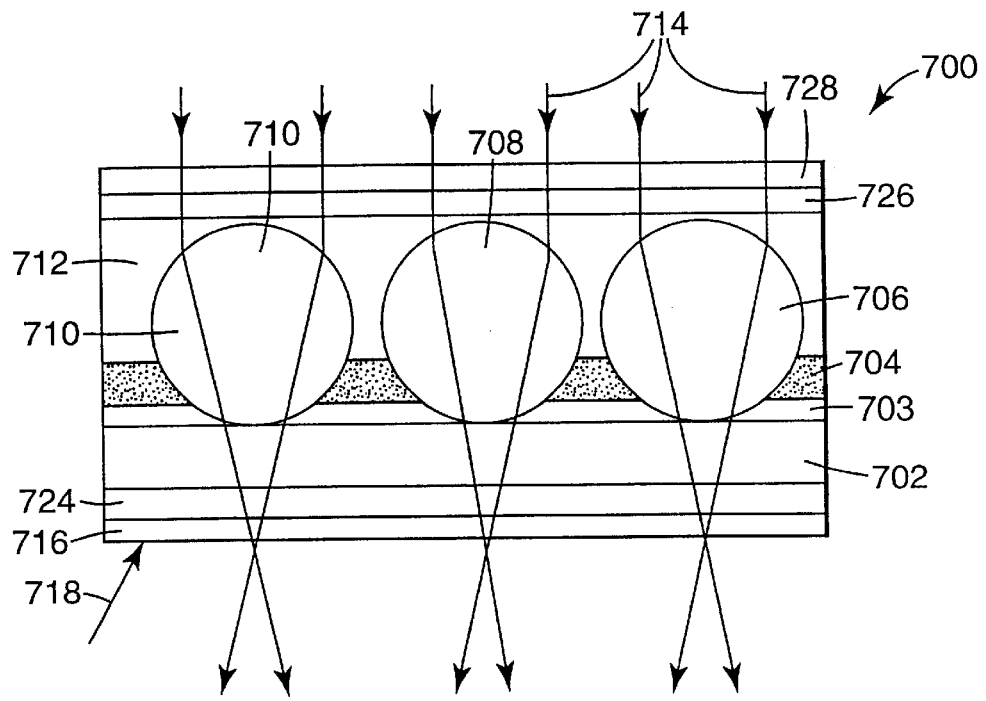
FIG. 7 illustrates a fourth embodiment of a film according to the present invention, having a Fresnel lens on an input side of the film.

Another embodiment of a film 700 is illustrated in FIG. 7. The film 700 includes a substrate layer 702, a layer of transparent material 703, an absorbing layer 704, beads 706, 708, and 710, and a transparent cover layer 712. In addition, a first polarizing layer 716 and a first quarter-wave retarding layer 724 are positioned on the viewing side of the film 700, and a second quarter-wave retardation layer 726 is positioned on the illuminated side of the film 700. A second polarizer layer 728 may be provided on the second quarter-wave retardation layer 726. The relative orientations of the polarizing layers 716 and 728 may be chosen so that they operate as crossed polarizers.

An advantage of this arrangement is that it provides increased discrimination against ambient light 718. The first polarizing layer 716 absorbs around 50% of the incident ambient light 718, permitting a linearly polarized fraction to be transmitted. This linearly polarized fraction of ambient light passes through the first quarter-wave retardation layer 724 to become circularly polarized. The circularly polarized ambient light may be reflected from an interface between the component parts of the film 700. Such reflected light passes once more through the first quarter-wave retardation layer 724 to become linearly polarized in the direction of maximum absorption in the first polarizing layer 716. Consequently, ambient light reflected within the film 700 is not transmitted back out of the film, but is absorbed, thus reducing the amount of ambient light mixing with the image transmitted through the film 700. This reduction in ambient light advantageously enhances the contrast of the film 700.

The film 700 may operate without the second polarizing layer 728, especially where the light 714 illuminating the film 700 is linearly polarized.

Figure 8:
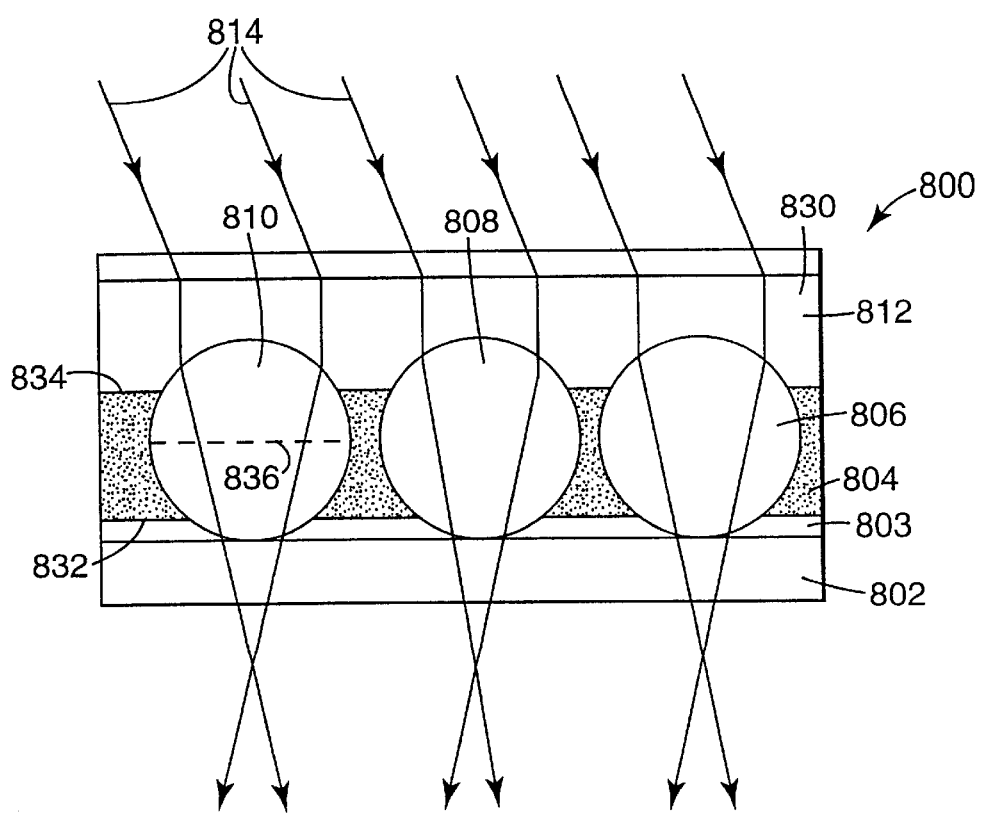
FIG. 8 illustrates a fifth embodiment of a film according to the present invention, having a scattering layer above an absorbing layer.

Another embodiment of a film is illustrated in FIG. 8. The film 800 includes a substrate layer 802, a layer of transparent material 803, an absorbing layer 804, beads 806, 808, and 810, and a transparent cover layer 812.

The lower surface 832 of the absorbing layer 804 lies on the layer of transparent material 803 which, as stated above, is typically less than halfway up the bead. Alternatively stated, the lower surface 832 of the absorbing layer 804 is closer to the substrate layer 802 than is a bead diameter 836 that is substantially parallel to the substrate layer 802. The upper surface of the absorbing layer 804 may lie further from the substrate layer 802 than the diameter 836 which is substantially parallel to the substrate layer 802. When the absorbing layer 804 is relatively thick, its absorption depth may be reduced by reducing the concentration of the absorbing species. This may be advantageous where the absorbing layer 804 is also used as a scattering layer, as discussed below.

The film 800 may be provided with a Fresnel lens 830, or other diffractive optical component. An advantage provided by the Fresnel lens 830 is that it may be used to collimate the image light 814 incident on the film 800, or otherwise refocus the image light 814, when the image light 814 does not illuminate the film at a normal angle of incidence. For example, the Fresnel lens 830 may collimate light transmitted from a point source, or a series of point sources.

Figure 9:
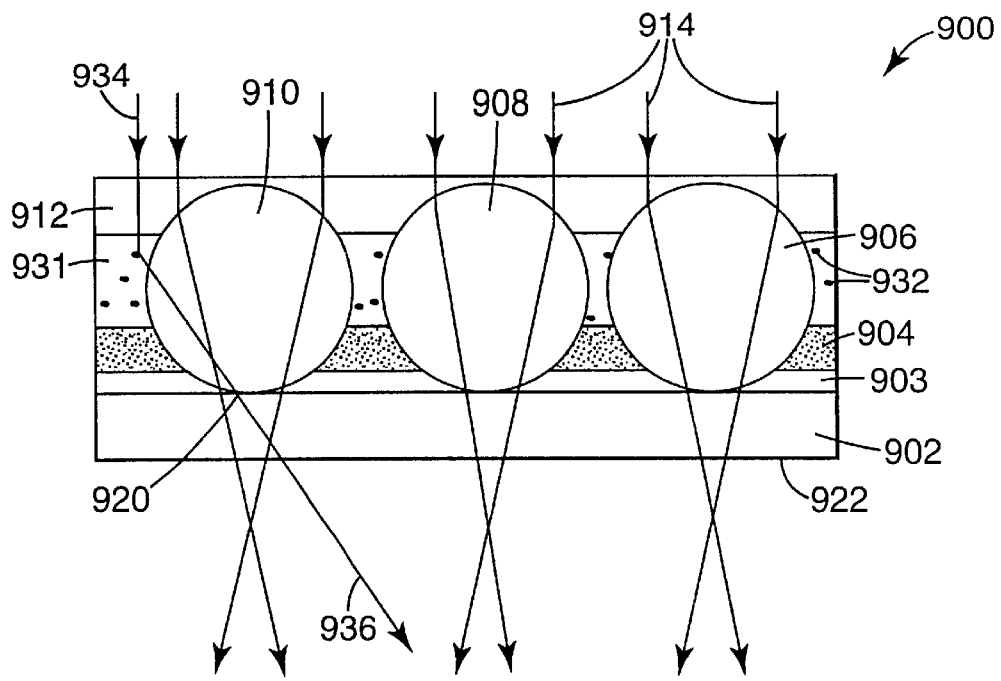
FIG. 9 illustrates a sixth embodiment of a film according to the present invention, having scattering particles dispersed within the absorbing layer.

Another embodiment of a film 900 is illustrated in FIG. 9. The film 900 includes a substrate layer 902, a layer of transparent material 903, an absorbing layer 904, beads 906, 908, and 910, and a transparent cover layer 912. The film 900 also incorporates a scattering layer 931 interposed between the cover layer 912 and the absorbing layer 904. The scattering layer 931 may be formed from the same material as the transparent material 903, with scattering particles 932 disposed therein. The scattering particles 932 may be formed, for example, from small particles of calcium carbonate, or any other suitable scattering material. The scattering particles may be formed from organic or inorganic material, and may be irregularly shaped or regularly shaped.

The scattering layer 931 may be used to increase the transmission of light through the film 900. For example, without the scattering layer 931, interstitial light beam 934 would normally be absorbed in the absorbing layer 903.

However, interstitial light beam 934 is scattered by a scattering particle 932 into the bead, so that the light beam 936 passes through the exit portion 920 and it transmitted through the viewing surface 922 of the film 900. The addition of a scattering layer provides another parameter useful for controlling the gain and viewing angle of the film 900.

Figure 10:
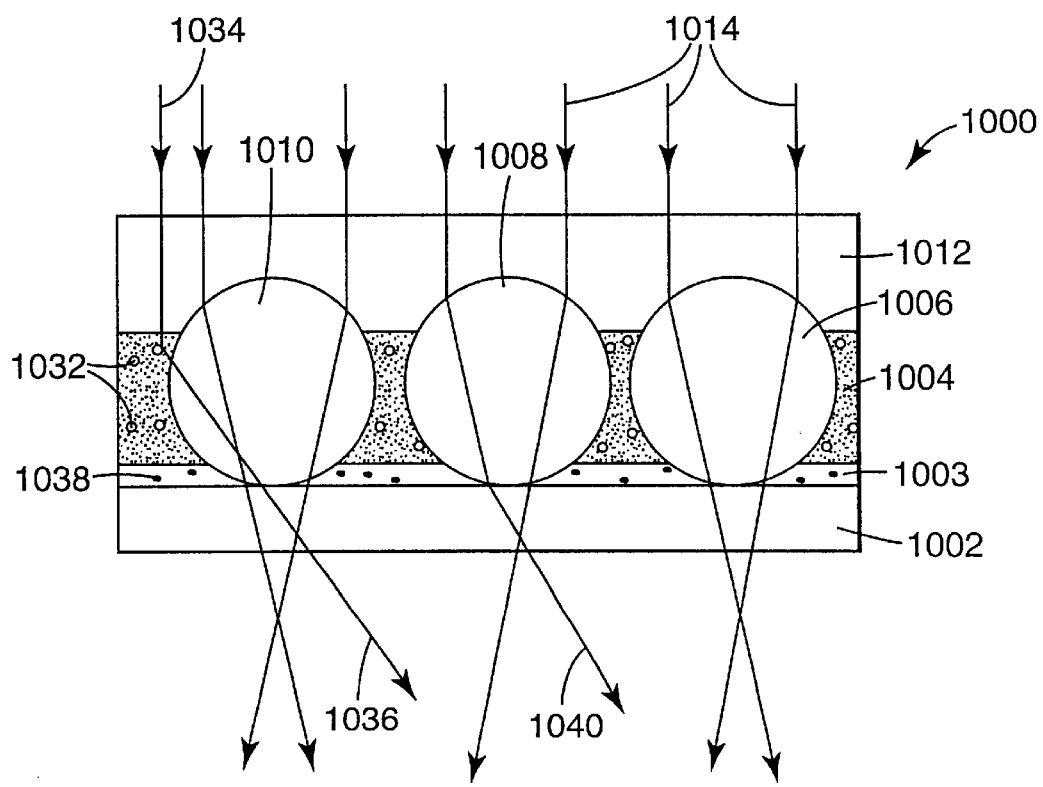
FIG. 10 illustrates an hexagonally packed array of beads on a film according to an embodiment of the invention.

Another embodiment of a film 1000 is illustrated in FIG. 10. The film 1000 includes a substrate layer 1002, a layer of transparent material 1003, an absorbing layer 1004, beads 1006, 1008, and 1010, and a transparent cover layer 1012. In this embodiment, scattering particles 1032 are disposed within the absorbing layer 1004. Light rays 1014 are typically refracted by the beads 1006, 1008 and 1010, whereas the interstitial light beam 1034 lies outside bead 1010 and would normally be absorbed in the absorbing layer 1004. However, a scattering particle 1032 scatters light beam into the bead 1010. The scattered light beam is transmitted by the film 1000 as beam 1036. Thus, the presence of scattering particles in the absorbing layer 1004 may increase the amount of light transmitted by the film 1000. Additionally, the introduction of scattering particles 1032 into the absorbing layer 1004 may also increase the gain and viewing angle of the film 1000.

If the absorption depth of the absorbing layer 1004 is short, then only light scattered near the top of the absorbing layer, and close to the bead surface, will reach the bead, and light that has too long a path length within the absorbing layer will simply be absorbed, rather than scattered. Thus, when the absorbing layer 1004 is used with scattering particles 1032, the absorption depth of the absorbing layer 1004 is adjusted so that a significant amount of light is scattered, rather than simply absorbed.

The layer of transparent material 1003 may also be provided with scattering particles 1038 to scatter light 1040 transmitted by the beads, thereby providing additional control over the gain and the viewing angle of the film 1000.

It will be appreciated that the size and number of scattering particles in both the absorbing layer 1004 and in the layer of transparent material 1003 may be adjusted to control the gain and the viewing angle.

Figure 11:
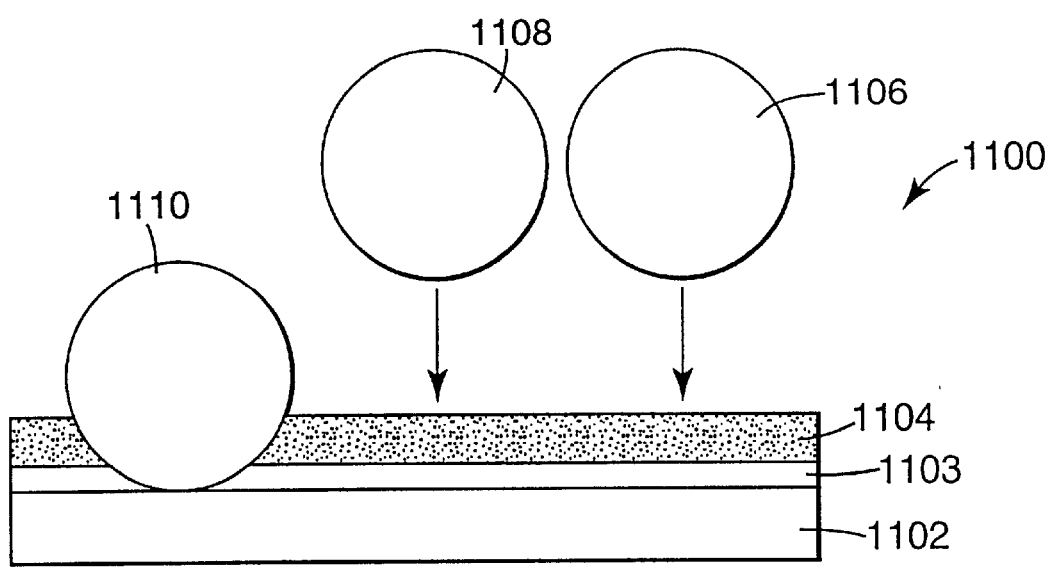
FIG. 11 illustrates a first method of manufacturing the dispersing film.

FIG. 11 illustrates part of a first method of manufacturing a light dispersing film 1100. First, a layer of transparent material 1103 is laid on the substrate layer 1102, and then an absorbing layer 1104 is laid over the layer of transparent material 1103. The beads 1106, 1108 and 1110 are pressed through the absorbing layer 1104, and into the transparent material 1103. The beads may be pressed into the absorbing layer 1104 and the transparent material 1103 using, for example, a flat plate or a roller.

The transparent material 1103 may be an adhesive, such as a pressure sensitive adhesive, or a thermoplastic polymer such as polyethylene.

The absorbing layer 1104 may be softer than the layer of transparent material 1103, for example, because of the intrinsic properties of the absorbing and transparent materials. The absorbing material may also have a lower glass temperature, $T_{ga}$, than the glass temperature of the transparent material, $T_{gt}$, and the structure of layers 1102, 1103 and 1104 may be heated to a temperature above $T_{ga}$ to achieve the desired softness of the absorbing layer 1104. The difference in softness between layers permits the beads, as they are pressed towards the substrate layer 1102, to push the absorbing layer 1104 out of the way, so that little or no absorbing material remains on the lower surface of the bead at its exit portion within the transparent material 1103 to reduce the amount of light transmitted by the bead.

The absorbing layer 1104 may be additionally be formed of a material that does not readily wet the surface of the beads, so that the possibility of absorbing material remaining in the bead's exit portion is reduced.

The transparent material 1103 may be an adhesive material, so that the beads adhere to the transparent material 1103 as they are pushed into it. The transparent material 1103 may also be curable, so that, once the film 1100 is cured, the beads are held, at least in part, by the transparent layer 1103.

Once the beads have been pressed into the transparent material 1103, a transparent cover layer (not illustrated in FIG. 11) may be applied over the top of the beads 1106, 1108 and 1110, and the absorbing layer. A scattering layer may also be provided between the absorbing layer and the cover layer. The cover layer provides protection for the beads and may also be used to support the beads within the film. Other layers may be applied to the film 1100, such as polarizing layers and quarter-wave retardation layers, scattering layers, Fresnel lenses and other diffracting optics, to produce the structures described hereinabove.

Figure 13A:
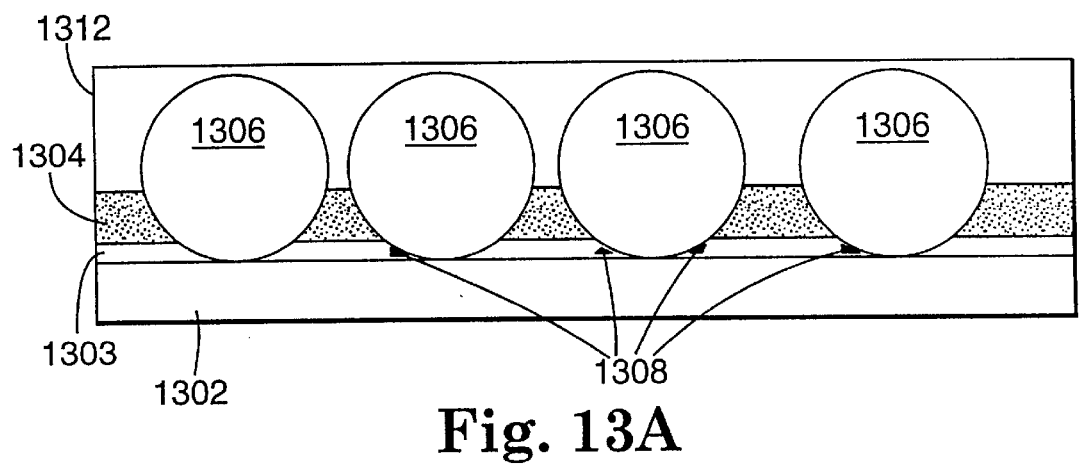
FIGS. 13A–13C illustrate a third method for manufacturing the dispersing film.
Figure 13B:
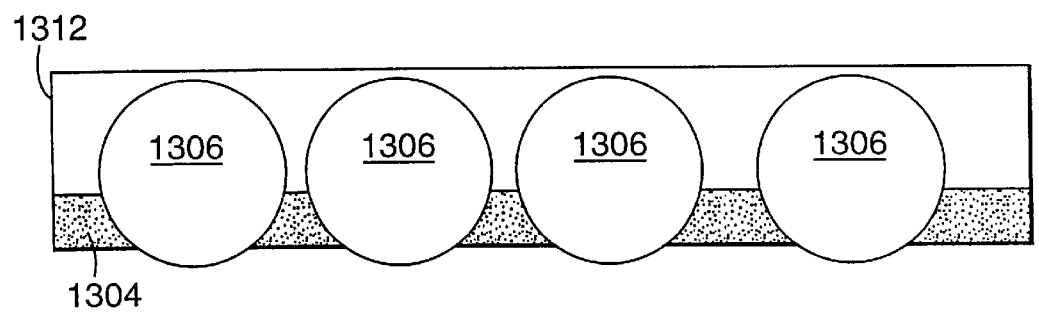
Figure 13C:
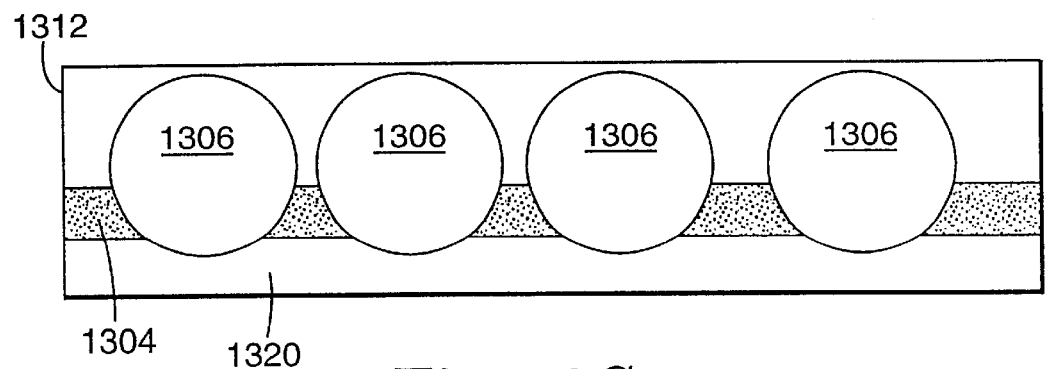

It is possible that portions of absorbing material may be present on the exit surfaces of the beads after the beads have been pushed through the absorbing layer and into the transparent layer. If this occurs, the light transmission through the beads may be reduced because the portions of absorbing material occlude the output from the beads. This situation is illustrated in FIG. 13A, where the beads 1306 have been pushed through the absorbing layer 1304 into a transparent layer 1303 over a substrate 1302. Some portions of absorbing material 1308 are present at the output surfaces of the beads 1306. In one embodiment of a method for removing the portions of absorbing material 1308, the substrate 1302 is removed or etched away, leaving the transparent layer 1303 exposed. The transparent layer 1303 may then be etched, to remove both the transparent layer 1303 and the portions of absorbing material 1308, to produce the structure illustrated in FIG. 13B. Etching may be performed by an oxygen plasma etch or, where the transparent layer 1303 is formed of a photoresist-type material, etchable by an alkaline solution, the etching may be performed using a mildly basic water etch, such as 0.01%–20% NaOH solution. The transmission of the beads 1306 is increased by removal of the portions of absorbing material 1308. A replacement substrate layer 1320 may then be disposed over the exposed light absorbing layer 1304, to produce the structure illustrated in FIG. 13C. In addition, the replacement substrate layer 1320 may be formed from a single layer of substrate material, as illustrated, or from one or more layers (not illustrated).

Figure 12:
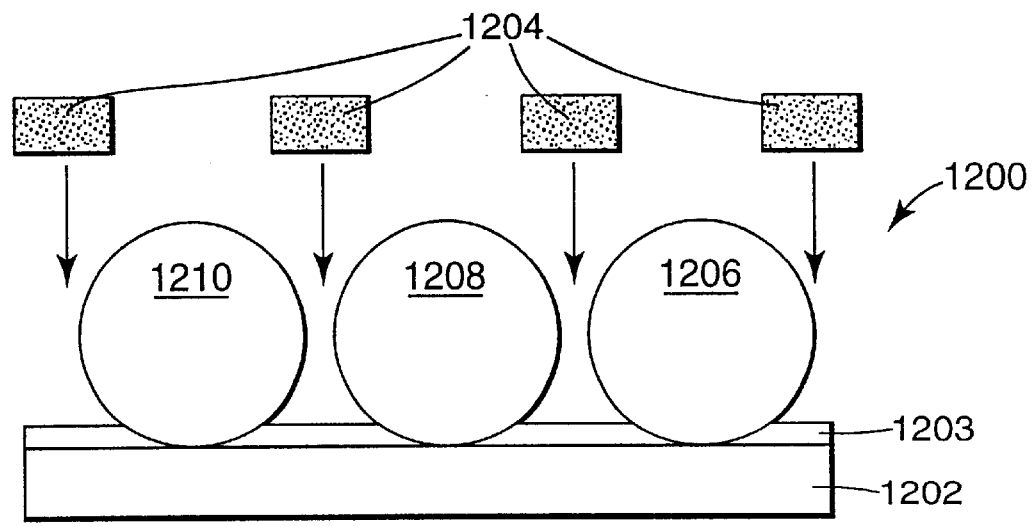
FIG. 12 illustrates a second method of manufacturing the dispersing film.

FIG. 12 illustrates stages in a second method of manufacturing a light dispersing film 1200. First, a layer of transparent material 1203 is laid on the substrate layer 1202, and then the beads 1206, 1208, and 1210 are pressed into the transparent material 1203. The beads may be pressed, for example, using a flat plate or a roller. The transparent material 1203 may be an adhesive, or at least tacky, material so that the beads adhere as they are pushed into the transparent material 1203. The transparent material 1203 may also be curable, so that, once the film 1200 is cured, the beads are held, at least in part, by the transparent layer 1203.

Once the beads have been applied to the transparent material 1203, the absorbing material 1204 is applied as a layer on top of the transparent material 1203, in the interstices between the beads. Suitable absorbing materials include dyes, carbon black, and organic or inorganic pigments with a wide variety of sizes and shapes. The material can be dispersed either in a liquid or a solid binder system. The absorbing material 1204 can be applied by conventional coating techniques or powder coating. In one particular embodiment of a method of applying the absorbing material 1204 using a liquid dispersion, the surface tension of the coating solution may be high enough so that the solution does not readily wet the surface of the beads 1206, 1208 and 1210. Consequently, the absorbing material 1204 rolls off the beads into the interstitial spaces, and does not remain on the upper surfaces of the beads where it might adversely affect the amount of light entering the bead.

After the absorbing material 1204 has been applied, a cover layer (not illustrated) may then be applied, or a scattering layer, followed by a cover layer. Other layers may be applied to the upper and lower surfaces of the film 1200. For example, quarter-wave retardation layers, polarizing layers, Fresnel lenses and other diffracting optical layers may be applied to produce the structures described hereinabove. Additionally, quarter-wave retardation and polarizing layers may be applied between the substrate layer 1202 and the transparent material 1203.

Figure 14A:
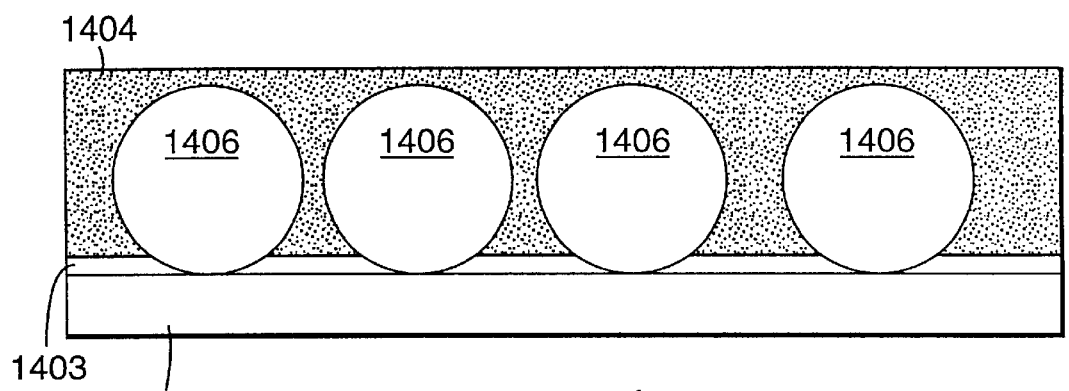
FIGS. 14A–14C illustrate a fourth method for manufacturing the dispersing film.
Figure 14B:
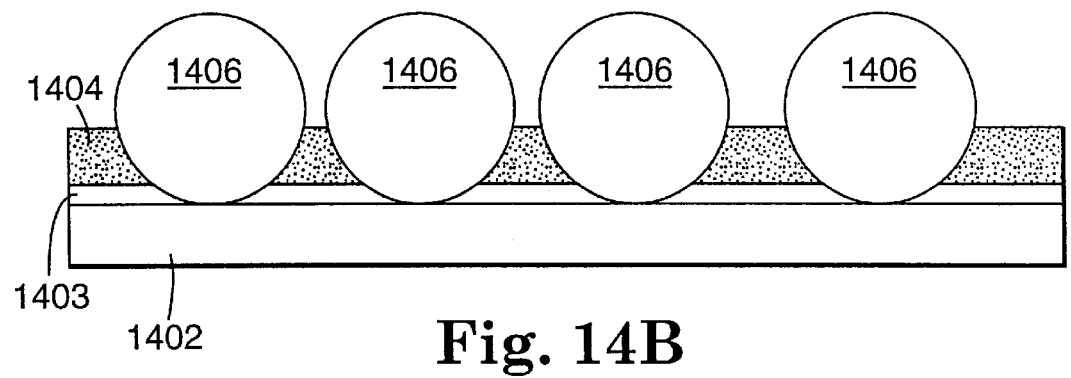
Figure 14C:
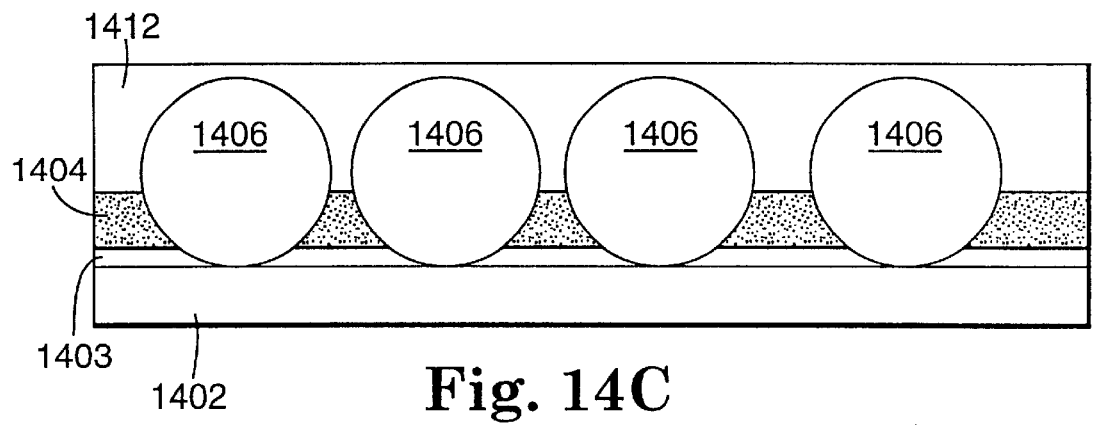

Another embodiment of a method of applying a layer of absorbing material is illustrated in FIGS. 14A–14C. Beads 1406 having selected refractive index and size are first embedded in a transparent material 1403 overlying a substrate 1402. A light absorbing layer 1404 is then coated over the beads 1406. Some, or all of the beads 1406 may be completely covered by the absorbing layer 1404, as illustrated in FIG. 14A. The absorbing layer 1404 is then etched back to reveal the upper surface of the beads 1406, illustrated in FIG. 14B. The extent of the etch is determined by the thickness of the light absorbing layer 1404 remaining over the beads 1406 after the absorbing layer 1404 is applied. After etching, the light absorbing layer 1404 remains sufficiently thick to effectively absorb light incident thereon passing therethrough, as discussed hereinabove. After etching back the absorbing layer 1404, a cover layer 1412 is applied, to produce the structure illustrated in FIG. 14C.

In another embodiment of a method of fabricating a film of the present invention, beads having a selected refractive index are disposed on a partially dried light absorbing layer coated on to a clear thermoplastic substrate. The film is then heated in an oven, for example a convection oven, to a temperature sufficient to soften or melt the thermoplastic substrate. The softening or melting of the substrate layer enables the beads to "sink" into the substrate layer. After the film is removed from the oven and cooled, the beads may be overcoated with a polymeric coating to control the effective refractive index of the beads, as described above. This method may be used for fabricating a film where there is a single transparent layer below the absorbing layer.

Figure 16:
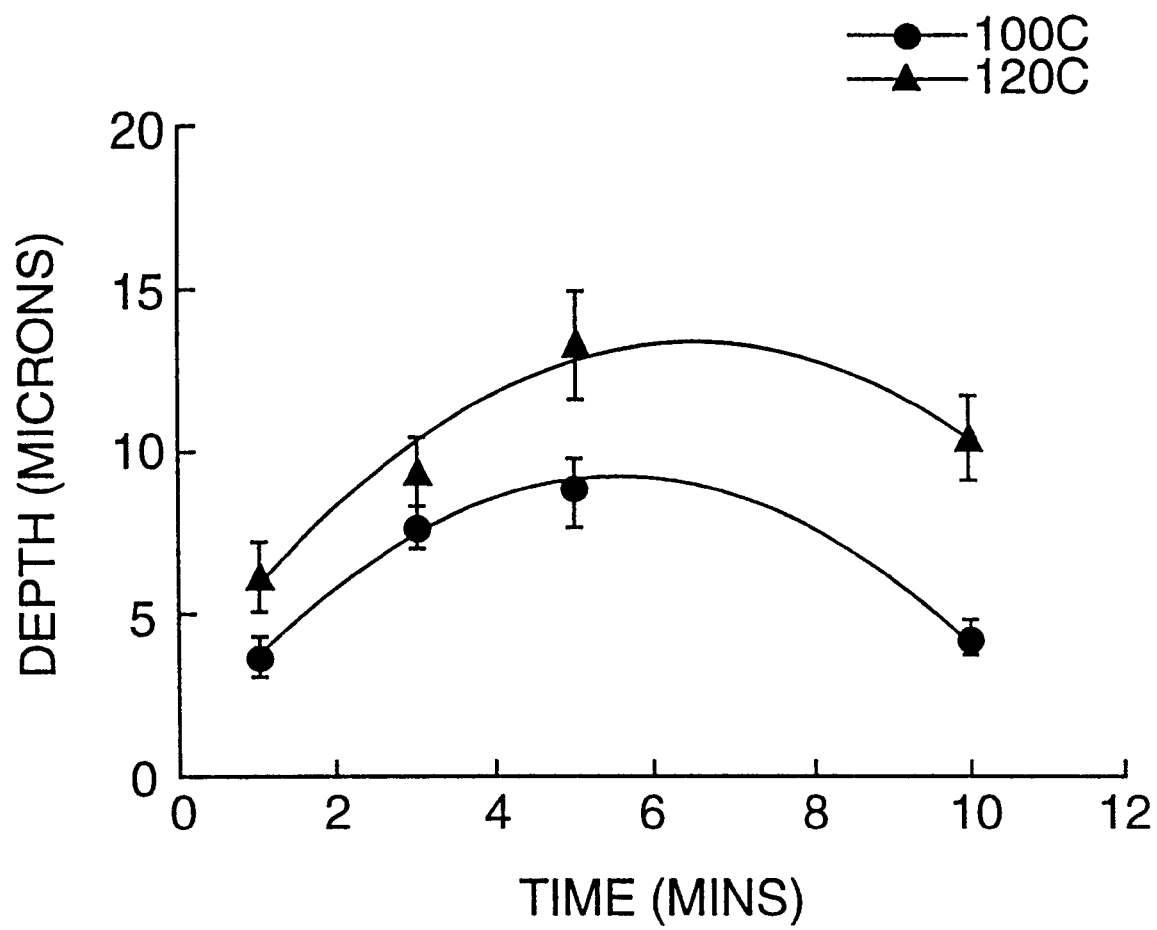
FIG. 16 illustrates a relationship between bead penetration depth and heating time for a thermoplastic transparent layer.

A study of the "sink depth" of glass beads into a polymeric layer was conducted, the results of which are illustrated in FIG. 16. In this study, glass beads were dispersed on a polyethylene substrate and left in an oven for a certain period of time. After removal from the oven, the beads were removed and the indentation depth was measured using a confocal microscope. The results presented in FIG. 16 were produced at two different temperatures, 100° C. (curve 1602) and 120° C. (curve 1604). IT was found that the sink depth was greater for the higher temperature, and that the sink depth peaked at a heating time of approximately 5–7 mins.

Figure 17A:
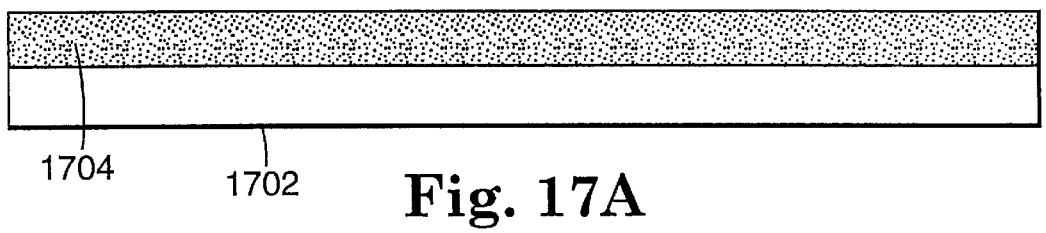
FIG. 17 illustrates fabrication steps in another method for manufacturing the dispersing film.
Figure 17B:
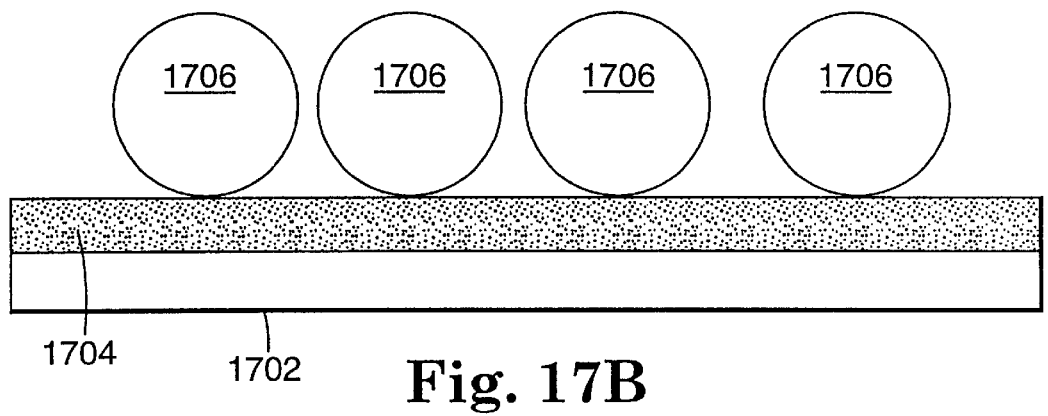
Figure 17C:
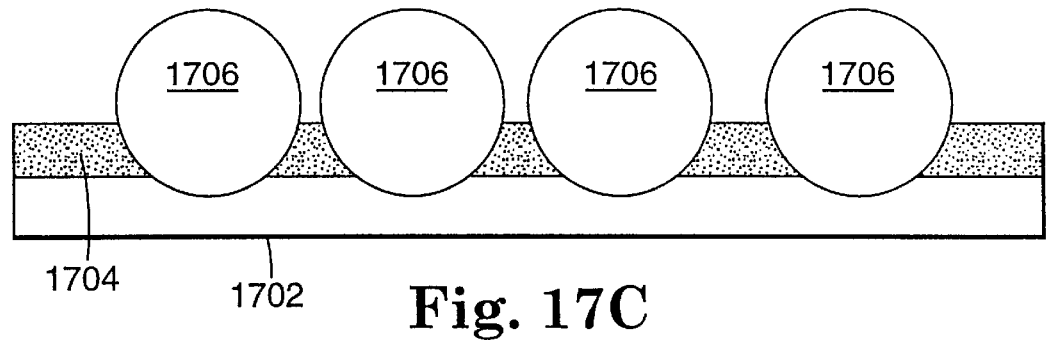
Figure 17D:
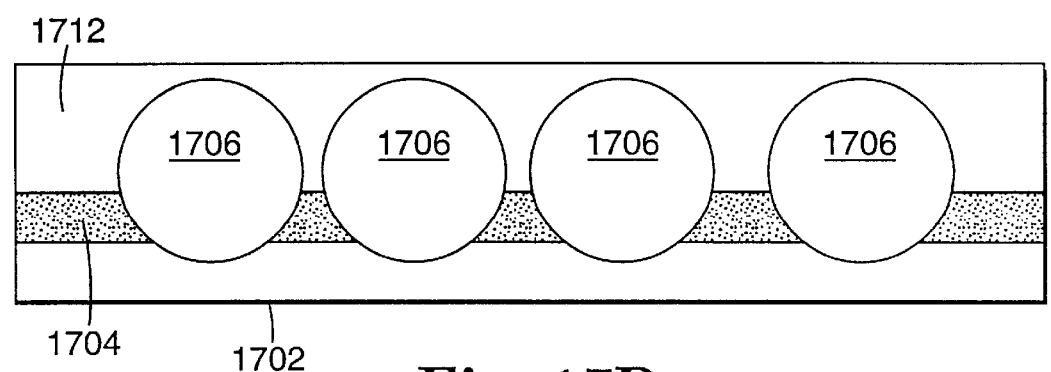

As an example of this method, illustrated in FIGS. 17A–17B. A 3 mil thick layer of polyethylene 1702 was coated with a solution containing carbon black, polymeric binder and a cross-linker to form an absorbing layer 1704, to produce the structure shown in FIG. 17A. The coating step was carried out using a knife-bar, but may be carried out using other methods. The coating was partially dried in an oven at 60° C. for 45 seconds. Glass beads 1706, having a refractive index of 1.9, were dispersed on the partially dried coating, to produce the structure shown in FIG. 17B. The sample was then heated in the oven at 130° C. for 3–5 min. to allow the beads 1706 to penetrate into the substrate layer 1702, to produce the structure shown in FIG. 17C. The heating also resulted in the evaporation of the solvent from the black coating and in cross-linking the polymeric binder. The film 1700 was then coated with a polymeric layer 1712 having a refractive index of 1.52, to produce the structure shown in FIG. 17D.

Figure 18A:
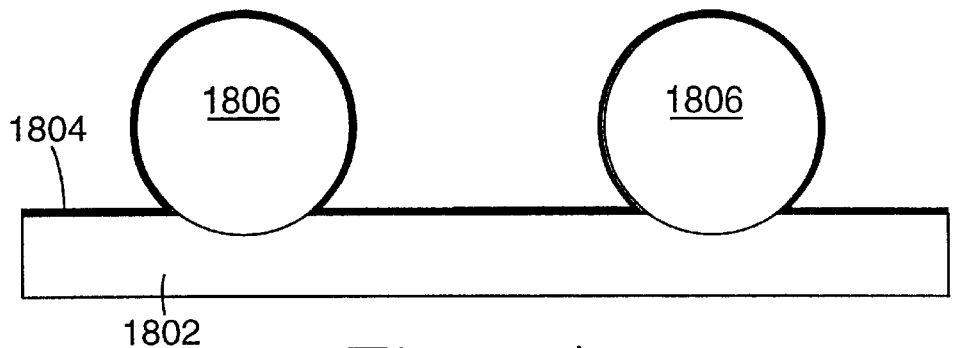
FIG. 18 illustrates fabrication steps in another method for manufacturing the dispersing film.
Figure 18B:
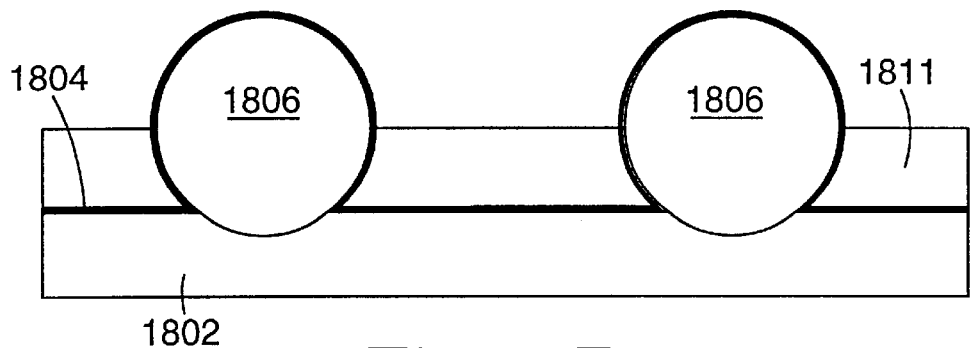
Figure 18C:
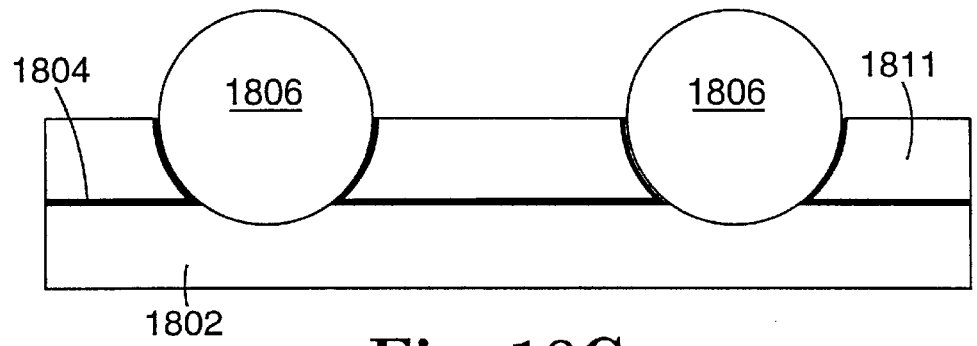
Figure 18D:
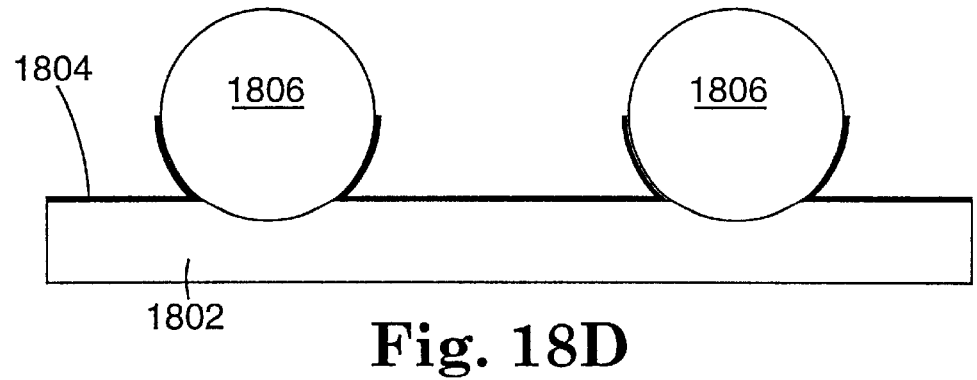

In another embodiment of a fabrication method, illustrated in FIGS. 18A–18D, beads 1806 were made to penetrate into a transparent layer 1802 of a thermoplastic polymer by heating the polymeric layer. A thin metallic layer 1804 (200 nm thick copper) was vapor coated onto the beads 1806 and transparent layer 1802, to produce the structure illustrated in FIG. 18A. The illustration is not drawn to scale. A layer 1811 of Shipley type 1818 photoresist was then coated over the structure with a knife coater, The photoresist layer 1811 was etched back using an oxygen plasma etch remove the photoresist from the upper surfaces of the beads 1806, as illustrated in FIG. 18B. The film was then dipped in a ferric chloride solution to etch the copper 1804 from the bead tops, to produce the structure illustrated in FIG. 18C. The photoresist 1811 protected the areas between the beads 1806 from etching. Finally, the remaining photoresist 1811 was removed by rinsing in water, resulting in the structure shown in FIG. 18D, having beads 1806 embedded in a transparent layer, and with a layer of cooper 1804 operating as an absorbing layer over the transparent layer 1802 and the lower portions of the beads.

While various examples were provided above, the present invention is not limited to the specifics of the illustrated embodiments. For example, a combination of scattering layers may be employed in a film, including a scattering absorbing layer employed in conjunction with a scattering layer above the absorbing layer.

It will be appreciated that the outer surfaces of the film may be treated with additional coatings for protection against physical damage, such as hard coatings and anti-smudge coatings. In addition, antireflection coatings may be provided on the outer surfaces to reduce reflective losses.

In the above description, the positioning of layers has sometimes been described in terms of "upper" and "lower", "over" and "under", and "top" and "bottom". These terms have been used merely to simplify the description of the relative positions of different films illustrated in the figures, and should not be understood to place any limitations on the useful orientation of the film.

As noted above, the present invention is applicable to display systems as a light dispersing film. It is believed to be particularly useful in back projection displays and screens. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method of making a light dispersing film, comprising:

disposing optically transparent beads partially into an optically transparent layer, a bead penetration depth into the optically transparent layer being selected to substantially maximize light transmission through the optically transparent beads while maintaining essentially optimum contrast for the maximum light transmission, an absorbing layer overlying the optically transparent layer.

2. A method as recited in claim 1, wherein disposing the optically transparent beads in the optically transparent layer includes pressing the optically transparent beads into the optically transparent layer, and applying the absorbing layer in interstices between the optically transparent beads and over the optically transparent layer.

3. A method as recited in claim 2, wherein applying the absorbing layer in interstices between the optically transparent beads includes disposing a layer of absorbing material over the optically transparent beads, and etching the absorbing material to leave absorbing material in the interstices between the optically transparent beads.

4. A method as recited in claim 3, wherein disposing a layer of absorbing material over the optically transparent beads includes coating the beads with a metallic film, coating the metallic film with a photoresist, removing portions of the photoresist over the beads, and etching the metallic layer where the photoresist has been removed.

5. A method as recited in claim 1, wherein disposing the optically transparent beads in the optically transparent layer includes applying the absorbing layer over the optically transparent layer, and pressing the optically transparent beads through the absorbing layer and into the optically transparent layer.

6. A method as recited in claim 1, further comprising removing a substrate layer from the optically transparent layer to leave a remainder layer and etching the remainder layer.

7. A method as recited in claim 6, further comprising applying a replacement substrate layer over the absorbing layer and portions of the optically transparent beads exposed when etching the remainder layer.

8. A method as recited in claim 1, wherein disposing the optically transparent beads partially into the optically transparent layer includes penetrating the beads into a penetration layer of the optically transparent layer by less than a bead radius.

9. A method as recited in claim 1, wherein the penetration depth, t, is selected to be approximately equal to $$t = r\left(1 - \frac{x^2+8}{3x^2}\left[\frac{x^2-1}{3}\right]\right),$$

where r is the bead radius and x is a ratio given by a bead refractive index divided by a transparent cover layer refractive index, and x is less than or equal to 2.

10. A method as recited in claim 1, further comprising applying a transparent cover layer over the absorbing layer and the optically transparent beads.

11. A method as recited in claim 10, further comprising securing the beads within the optically transparent layer by the transparent cover layer.

12. A method as recited in claim 10, further comprising disposing a Fresnel lens over the transparent cover layer.

13. A method as recited in claim 10, further comprising disposing a first quarter-wave retardation layer over the transparent cover layer and a first polarizing layer over the first quarter-wave retardation layer, and disposing a second quarter-wave retardation layer below the absorbing layer and a second polarizing layer below the second quarter-wave retardation layer.

14. A method as recited in claim 1, further comprising disposing a quarter-wave retardation layer and a polarizing layer below the absorbing layer.

15. A method as recited in claim 1, further comprising disposing scattering particles in at least one of the optically transparent layer and the absorbing layer.

16. A method as recited in claim 1, further comprising disposing a scattering layer over the absorbing layer.

17. A method as recited in claim 16, further comprising applying a transparent cover layer over the scattering layer and the optically transparent beads.

18. A method as recited in claim 1, further comprising disposing the beads in one of a pressure sensitive adhesive film, a curable adhesive film and a hot-melt film as the optically transparent layer.

19. A method as recited in claim 1, further comprising partially surrounding one of the beads having a bead diameter substantially parallel to the substrate layer with the absorbing layer having an upper extent closer to the optically transparent layer than the bead diameter.

20. A method as recited in claim 1, further comprising partially surrounding one of the beads having a bead diameter substantially parallel to the substrate layer with the absorbing layer having an upper extent, wherein the bead diameter is closer to the optically transparent layer than an upper extent of the absorbing layer.

21. A method as recited in claim 1, wherein disposing the optically transparent beads comprises disposing the beads to lie penetrating through the absorbing layer and into the optically transparent layer.

* * * * *